United States Patent
Liu et al.

(10) Patent No.: US 10,551,838 B2
(45) Date of Patent: Feb. 4, 2020

(54) METHOD AND SYSTEM FOR MULTIPLE SENSOR CORRELATION DIAGNOSTIC AND SENSOR FUSION/DNN MONITOR FOR AUTONOMOUS DRIVING APPLICATION

(71) Applicant: NIO USA, Inc., San Jose, CA (US)

(72) Inventors: Xiaodong Liu, San Jose, CA (US); Bo Guo, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 206 days.

(21) Appl. No.: 15/671,521

(22) Filed: Aug. 8, 2017

(65) Prior Publication Data

US 2019/0049958 A1   Feb. 14, 2019

(51) Int. Cl.
*G05D 1/00* (2006.01)
*G06N 3/02* (2006.01)
*G05D 1/02* (2006.01)

(52) U.S. Cl.
CPC ......... *G05D 1/0088* (2013.01); *G05D 1/0246* (2013.01); *G05D 1/0257* (2013.01); *G06N 3/02* (2013.01)

(58) Field of Classification Search
CPC .. G05D 1/0088; G05D 1/0246; G05D 1/0257; G06N 3/02
USPC .......................................................... 701/28
See application file for complete search history.

(56) References Cited

U.S. PATENT DOCUMENTS

| | | | | |
|---|---|---|---|---|
| 10,256,890 | B2 * | 4/2019 | Neves | H04W 24/02 |
| 10,268,191 | B1 * | 4/2019 | Lockwood | G05D 1/0022 |
| 2006/0019679 | A1 * | 1/2006 | Rappaport | G01S 5/0252 |
| | | | | 455/456.5 |
| 2013/0219293 | A1 * | 8/2013 | Goldman-Shenhar | |
| | | | | G06F 3/0484 |
| | | | | 715/751 |
| 2015/0307110 | A1 * | 10/2015 | Grewe | B60W 50/029 |
| | | | | 701/36 |
| 2016/0358088 | A1 | 12/2016 | Lernmer et al. | |
| 2017/0113664 | A1 * | 4/2017 | Nix | B60T 7/12 |
| 2017/0195897 | A1 * | 7/2017 | Lopes | H04W 24/02 |
| 2017/0300762 | A1 * | 10/2017 | Ishii | B60R 1/00 |
| 2017/0327082 | A1 * | 11/2017 | Kamhi | B60H 1/00735 |
| 2018/0068459 | A1 * | 3/2018 | Zhang | G06T 7/246 |
| 2018/0201243 | A1 * | 7/2018 | Pennala | B60T 8/1701 |
| 2018/0201273 | A1 * | 7/2018 | Xiao | B60W 40/09 |

(Continued)

FOREIGN PATENT DOCUMENTS

| | | | | |
|---|---|---|---|---|
| DE | 102015215699 A1 * | 2/2017 | ............ | G01C 21/30 |
| DE | 102015218041 A1 * | 3/2017 | ............ | G01C 21/32 |
| WO | WO-2017021474 A1 * | 2/2017 | ............... | G06T 7/55 |

*Primary Examiner* — Tuan C To
(74) *Attorney, Agent, or Firm* — Sheridan Ross P.C.

(57) ABSTRACT

The system can diagnose sensor issues for a vehicle that can perform automatic driving functions based on areas where sensors overlap coverage and sensor performance limitation (SOTIF (Safety Of The Intended Functionality) in ISO 26262). First, the system can identify sensor overlap zones for advanced driver assistance systems/automated driving (ADAS/AD) applications that can be used for multiple sensor correlation and diagnostics. Once the zones have been identified, the system can define detailed multiple sensor correlation and diagnostics (e.g., the same kind of sensor, different kind of sensors, two-way plausible check, three-way voting, etc.). Finally, verified sensor output may be used in monitoring sensor fusion/deep neural network (DNN) outputs within defined a monitor zone.

20 Claims, 19 Drawing Sheets

(56) References Cited

U.S. PATENT DOCUMENTS

| | | | |
|---|---|---|---|
| 2018/0211403 A1* | 7/2018 | Hotson | G06K 9/4604 |
| 2018/0259966 A1* | 9/2018 | Long | G08G 1/00 |
| 2018/0300565 A1* | 10/2018 | Qin | G06K 9/00818 |
| 2018/0300620 A1* | 10/2018 | Gerardo Castro | G01S 7/4802 |
| 2018/0307925 A1* | 10/2018 | Wisniowski | G06K 9/00825 |
| 2018/0321758 A1* | 11/2018 | Serban | B61D 19/026 |
| 2019/0041497 A1* | 2/2019 | Smith | G01S 7/412 |

* cited by examiner

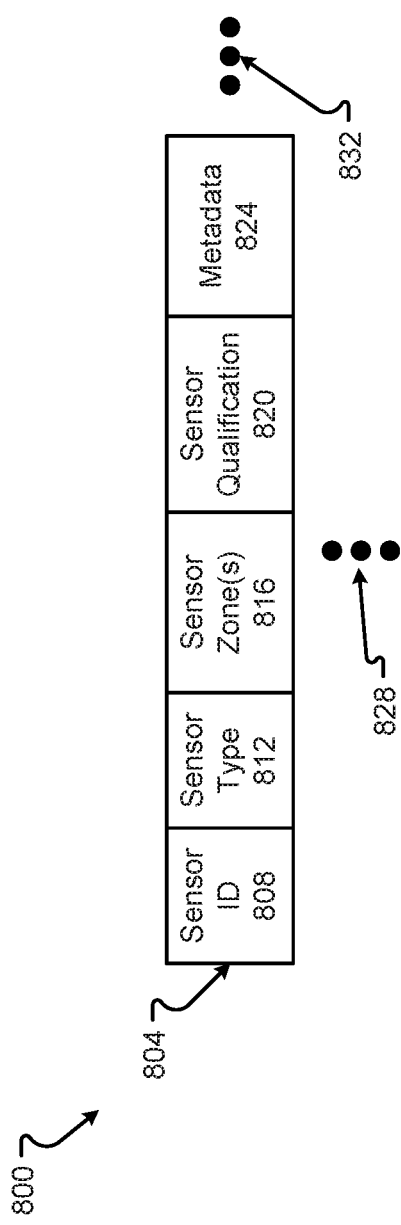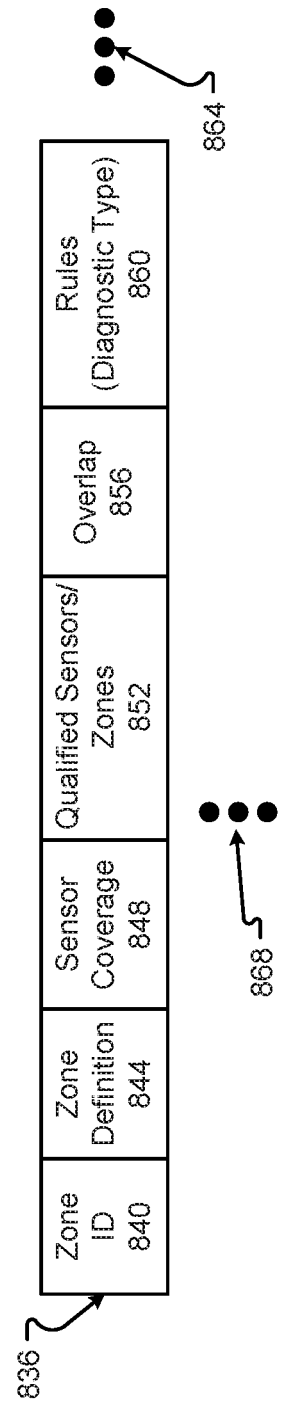
Fig. 8A
Fig. 8B

METHOD AND SYSTEM FOR MULTIPLE SENSOR CORRELATION DIAGNOSTIC AND SENSOR FUSION/DNN MONITOR FOR AUTONOMOUS DRIVING APPLICATION

FIELD

The present disclosure is generally directed to vehicle systems, in particular, towards autonomous driving vehicles.

BACKGROUND

In recent years, transportation methods have changed substantially. This change is due in part to a concern over the limited availability of natural resources, a proliferation in personal technology, and a societal shift to adopt more exterior environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure. In particular, the implementation of an artificially intelligent vehicle has lagged far behind the development vehicle subsystems.

BRIEF DESCRIPTION OF THE DRAWINGS

FIG. 8A is block diagram of a data structure in accordance with at least some embodiments of the present disclosure;

FIG. 8B is block diagram of another data structure in accordance with at least some embodiments of the present disclosure;

DETAILED DESCRIPTION

Figure 1:
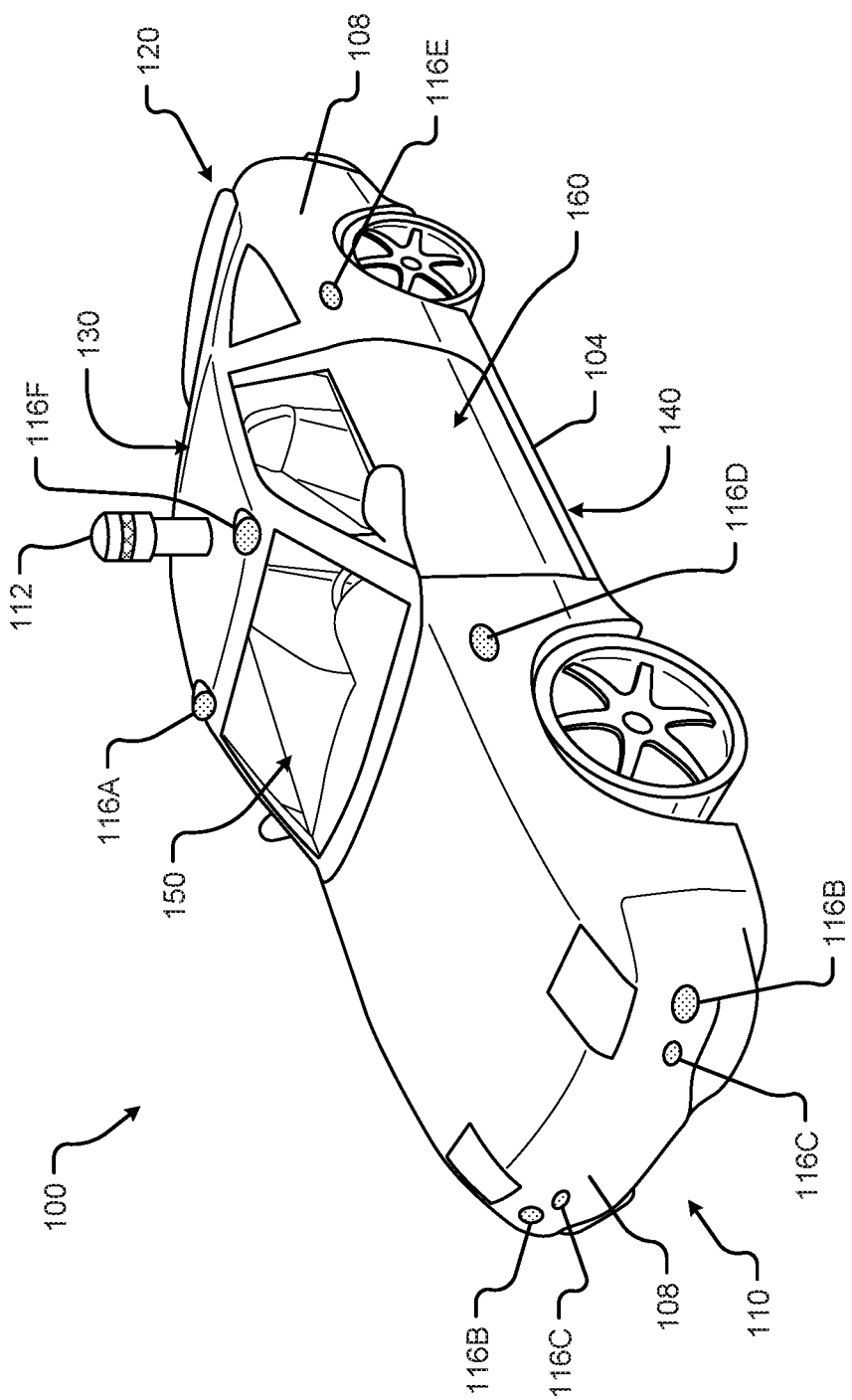
FIG. 1 shows a vehicle in accordance with at least some embodiments of the present disclosure.

Embodiments of the present disclosure will be described in connection with a vehicle, and in some embodiments, an electric vehicle, rechargeable electric vehicle, and/or hybrid-electric vehicle and associated systems. Some embodiments relate to an autonomous vehicle or self-driving vehicle. The systems and methods described herein can be applied to a vehicle equipped with a sensor suite that can observe information about an environment around the vehicle. The system can include diagnose sensor issues, degradation, or failure based on areas where sensors overlap coverage.

The systems and methods can delineate the environment around the vehicle into two or more zones. Each zone may be identified based on which of two or more sensors monitor the volume of space in the zone. Thus, as the number of sensors in the sensor suite increases, the number of possible zones increase, with each zone representing a different configuration of sensors monitoring each zone. The systems and methods described herein can then continually monitor each of the zones to determine if any sensor within a zone has degraded, malfunctioned, or is not sensing. Any change within the zone can lead to the zone being eliminated from usable data. Further, a determination that a problem with a sensor in one zone can affect or educate the monitoring of other zones that include that problematic sensor.

By separating the environment into zones, each zone can be monitored rather that each sensor in every portion of the sensor's field of sensing. In this way, the zones reduce the burden on monitoring system by reducing the amount of environmental space that needs to be monitored. Further, with fewer zones, the monitoring system can repeatedly and continuously monitor the function of the sensors in the zones to adjust continually to the performance of the sensors while reducing the number of calculation needed to determine problems with the sensor(s) in the environment. For example, a camera may not function properly in low or high light conditions. Thus, as the light conditions change when driving, the monitoring of zones can eliminate sensor data when light conditions cause issues with the camera sensors. The sensor systems can thus adjust in real time to actual conditions when driving to ensure a safer autonomous driving experience.

Sensors, for example, a camera, radar, Light Detection and Ranging (LiDAR), ultrasound, etc., with a sensor fusion/deep neural network (DNN) can be used in Advanced Driver Assistance Systems/Automated Driving (ADAS/AD) applications to improve overall vehicle safety. Most current advancements have focused on improving the sensor fusion quality/DNN by taking advantage of each sensor's performance strengths and the overlap in the sensors' coverage. Most sensor diagnostics have been performed by sensor suppliers. Diagnostic coverage is generally low according to ISO 26262 functional safety guidelines, and diagnosing output from the sensor fusion/DNN monitor (which is safety critical especially for autonomous driving) has proven very challenging.

The embodiments herein provide a method and system to achieve multiple sensor correlation diagnostics that can detect sensor performance limitations. Overall sensor diagnostics coverage can be improved through the monitoring of simplified sensor fusion/DNN results. First, the system can identify sensor overlap zones for ADAS/AD applications that can be used for multiple sensor correlation and diagnostics. Once the zones have been identified, the system can define detailed multiple sensor correlation and diagnostics (e.g., the same kind of sensor, different kind of sensors, two-way plausible check, three-way voting, etc.). Finally, verified sensor output may be used in monitoring sensor fusion/DNN outputs within defined a monitor zone.

Thus, the embodiments of the systems and methods herein provide process(es) to improve multiple sensor diagnostic coverage in autonomous driving applications. Further, the embodiments provide a strategy to monitor sensor fusion/DNN outputs with verified sensors and defined monitor zone. The embodiments can perform real time extensive diagnostic of sensors based on sensor overlapping and ISO 26262 guideline for Automotive Safety Integrity Level (ASIL) clarification to detect sensor failure and performance limitation. Further, embodiments can analyze the output from verified sensors to monitor outputs from the computer vision/DNN system.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or exterior environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2A:
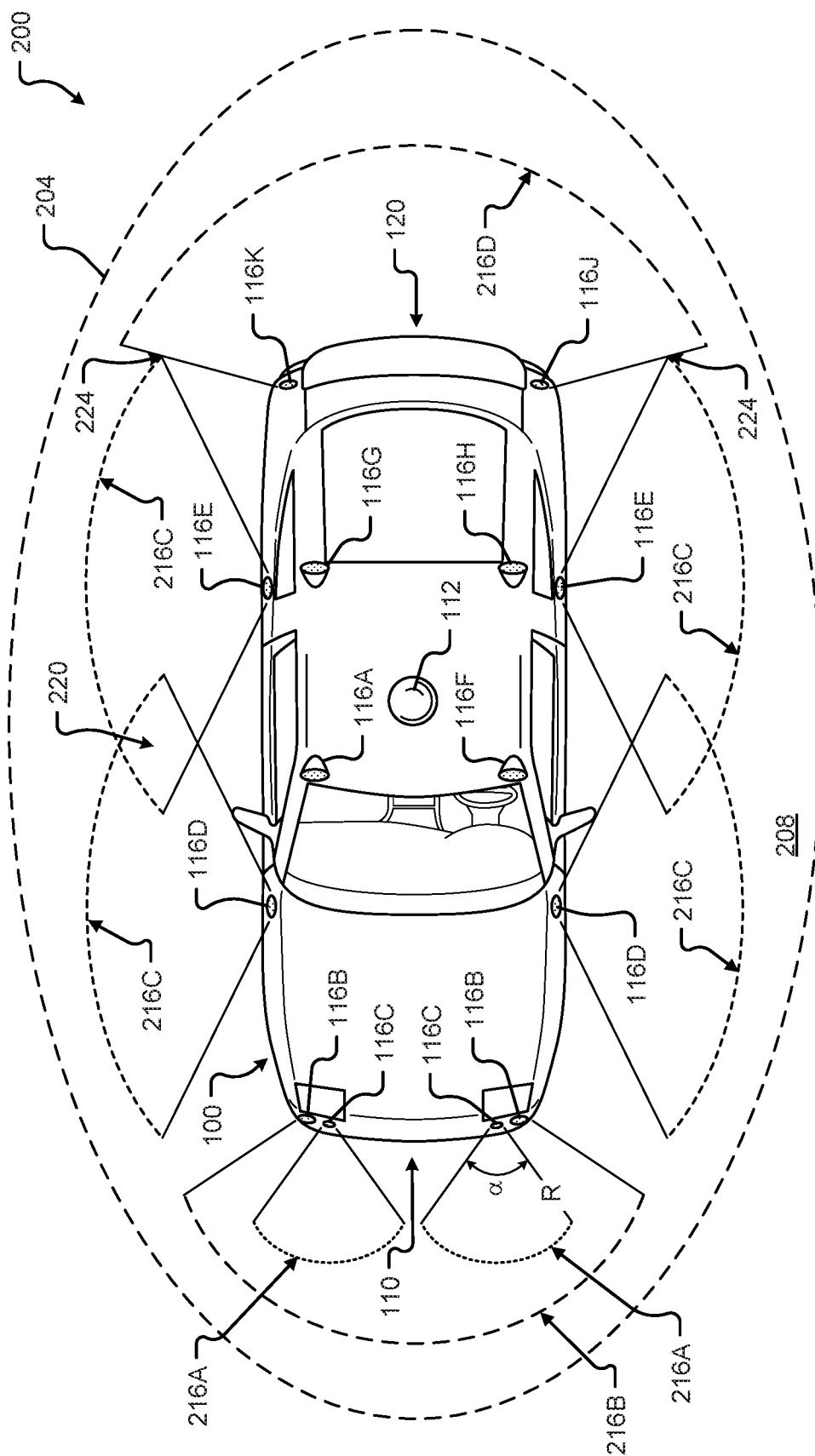
FIG. 2A shows a plan view of the vehicle in accordance with at least some embodiments of the present disclosure.

Referring now to FIG. 2A, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle α. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle α may define at least one angle of a span, or between horizontal and/or vertical limits, of a sensor 116A-K. As can be appreciated, the operational detection limit and the operational detection angle α of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 2B:
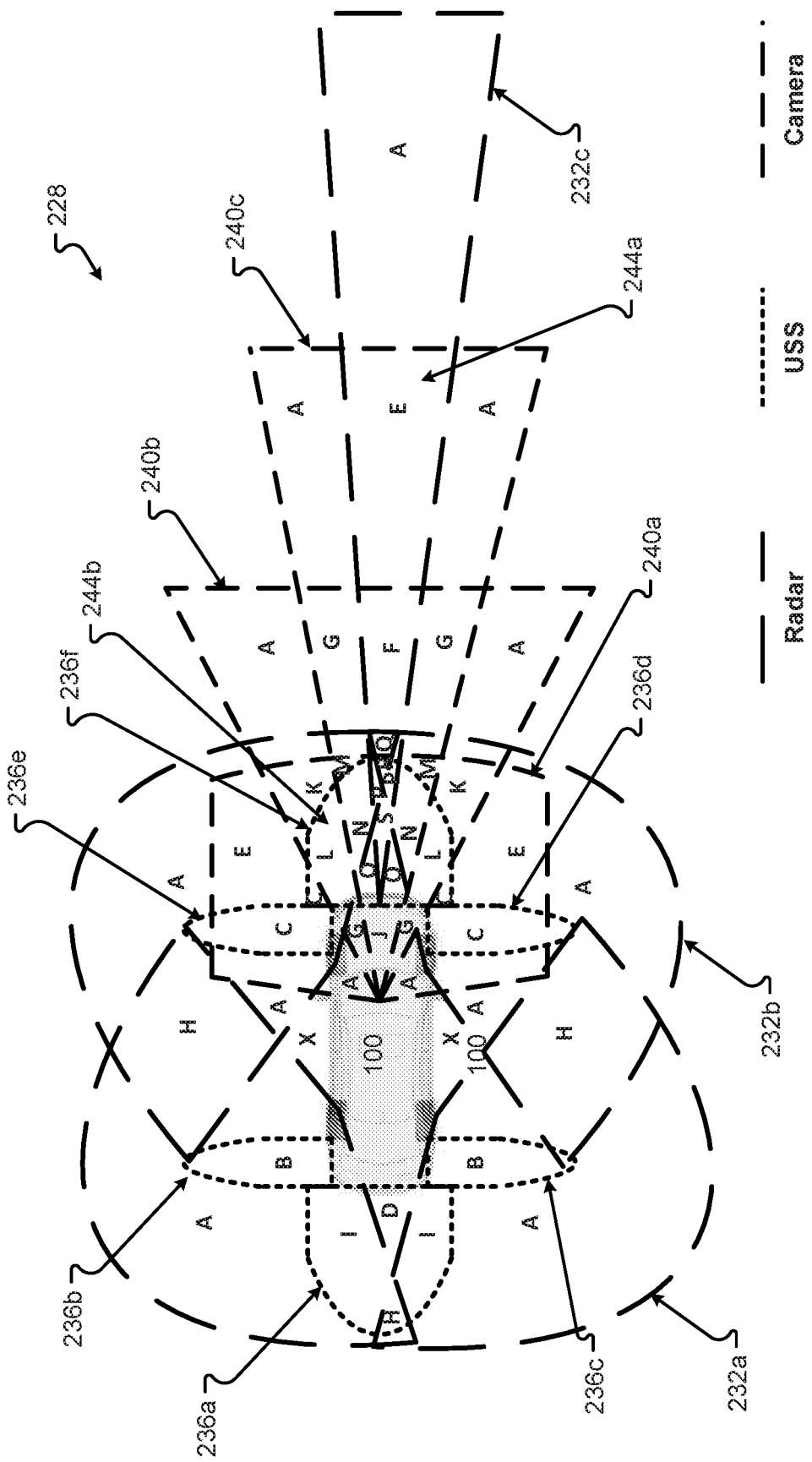
FIG. 2B shows a plan view of a sensor configuration of the vehicle in accordance with at least some embodiments of the present disclosure.

An embodiment of another sensor environment 228 may be as shown in FIG. 2B. A two-dimensional indication of each sensors' range of coverage may be as shown in FIG. 2B. The vehicle 100 may have one or more different types of sensors. In the example shown in FIG. 2B, the range of the radar sensors may be as designated by lines 232a through 232c. Likewise, the range of the ultrasonic or sound sensors may be as designated by dashed lines 236a through 236f. Further, the range for each camera sensors may be as designated by dashed lines 240a through 240c.

Each of the different sensors deployed on and/or in the vehicle 100 has various coverage limits indicated by the lines 232, 236, and/or 240, which represent the coverage limits of the sensors in a horizontal plane. The sensors may also have limitations both in distance from the vehicle 100 and in the vertical plane. These coverage limits, in the horizontal plane, the vertical plane, and in distance from the vehicle 100, may define the three-dimensional coverage area or limits for each of the sensors.

In some instances or configurations, only a single sensor may cover or sense in a certain three-dimensional area; these areas of single sensor coverage may be as designated by the letter A. Further, in some areas, there is no sensor coverage; these zones may be designated with the letter X or include the area outside of all the lines 232, 236, 240, shown in FIG. 2B. Other zones surrounding the vehicle 100 may be covered by two or more different sensors. Each of those zones may be designated by a letter B through S. These zones may have different sensor coverage. An example of the sensor coverage may be as indicated in the table below:

TABLE 1

| Zone | Sensor Coverage |
|---|---|
| A | Single Sensor |
| B | rear-left (RL)/rear-right (RR) Radar and Ultrasound scan (USS) |
| C | short-range (SR) Camera, front-left (FL)/front-right (FR) Radar and USS |
| D | USS vs USS |
| E | FL/FR Radar and SR Camera |
| F | long-range (LR) front-center (FC) Radar and LR + middle-range (MR) Two Cameras |
| G | LR + MR Two Cameras |
| H | Two Corner Radars |
| I | One Corner Radar and Two USS |
| J | Three Cameras |

TABLE 1-continued

| Zone | Sensor Coverage |
|---|---|
| K | FR/FL Radar and SR + MR Two Cameras |
| L | FR/FL Radar, SR + MR Two Cameras and USS |
| M | Three Cameras and FR/FL Radar |
| N | Three Cameras and FR/FL Radar, USS |
| O | Three Cameras and USS |
| P | Three Cameras and FR/FL Radar + LR FC Radar |
| Q | LR + MR Two Cameras and FR + FL Radar + LR FC Radar |
| R | Three Cameras and FR = FL Radar + LR FC Radar |
| S | Three Cameras and USS and LR FC Radar |
| X | No Coverage |

For the zones B through S where two or more sensors cover the area, the embodiments herein may be operable to determine if each sensor covering the area is working and/or working properly. As such, a camera may help to indicate whether a radar is functioning, a sound sensor may indicate whether a radar is functioning, a camera may indicate that a sound sensor is functioning, etc. In some zones, there may be three or more sensors to cover that zone, and each sensor may be operable to monitor and determine whether all the sensors covering that zone are functioning properly.

Figure 3:
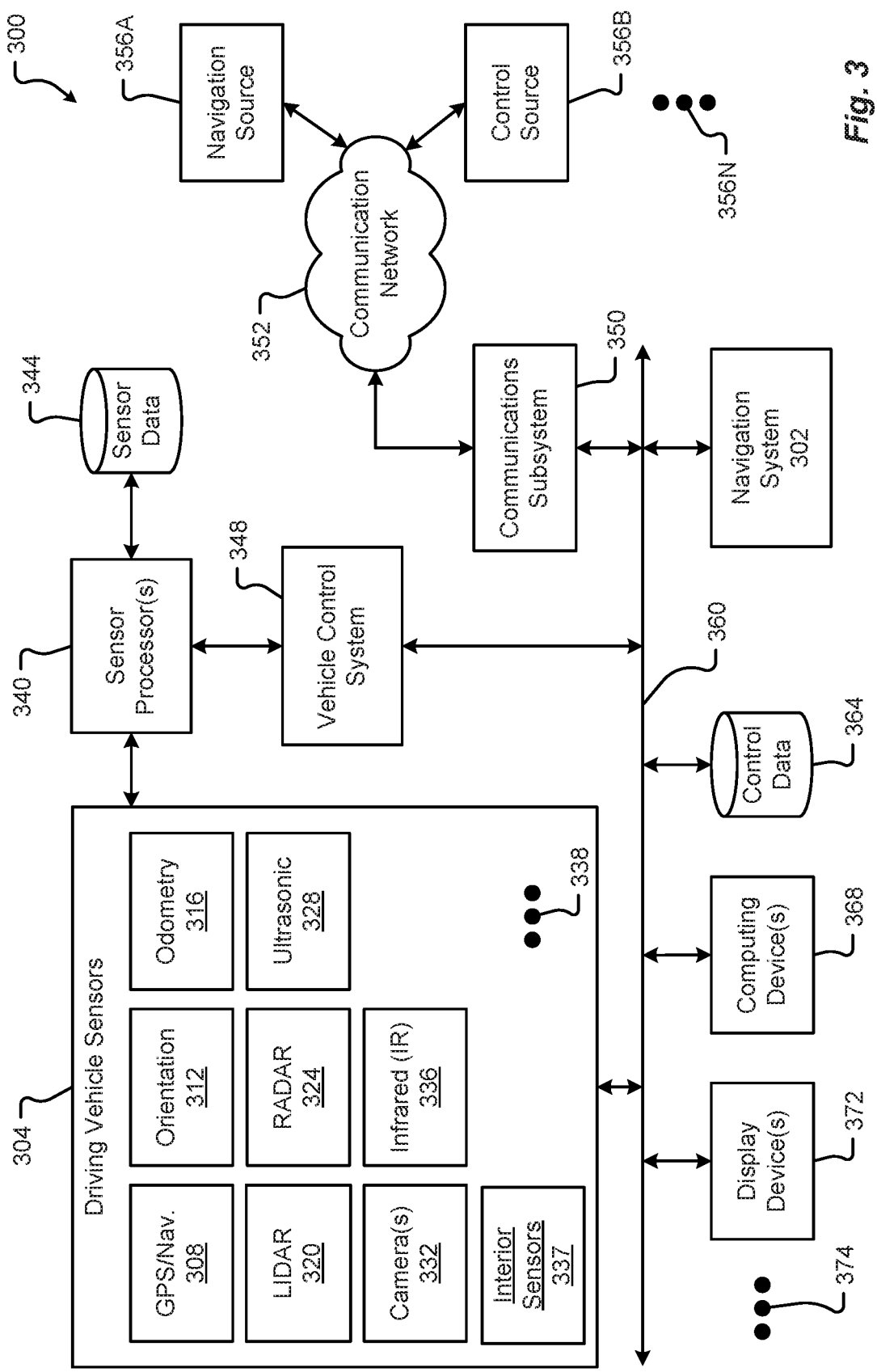
FIG. 3 is a block diagram of an embodiment of an operating environment of the vehicle in accordance with embodiments of the present disclosure.

FIG. 3 is a block diagram of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, and may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

In some embodiments, the driving vehicle sensors and systems 304 may include other sensors 338 and/or combinations of the sensors 308-336 described above. Additionally or alternatively, one or more of the sensors 308-336 described above may include one or more processors configured to process and/or interpret signals detected by the one or more sensors 308-336. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4A:
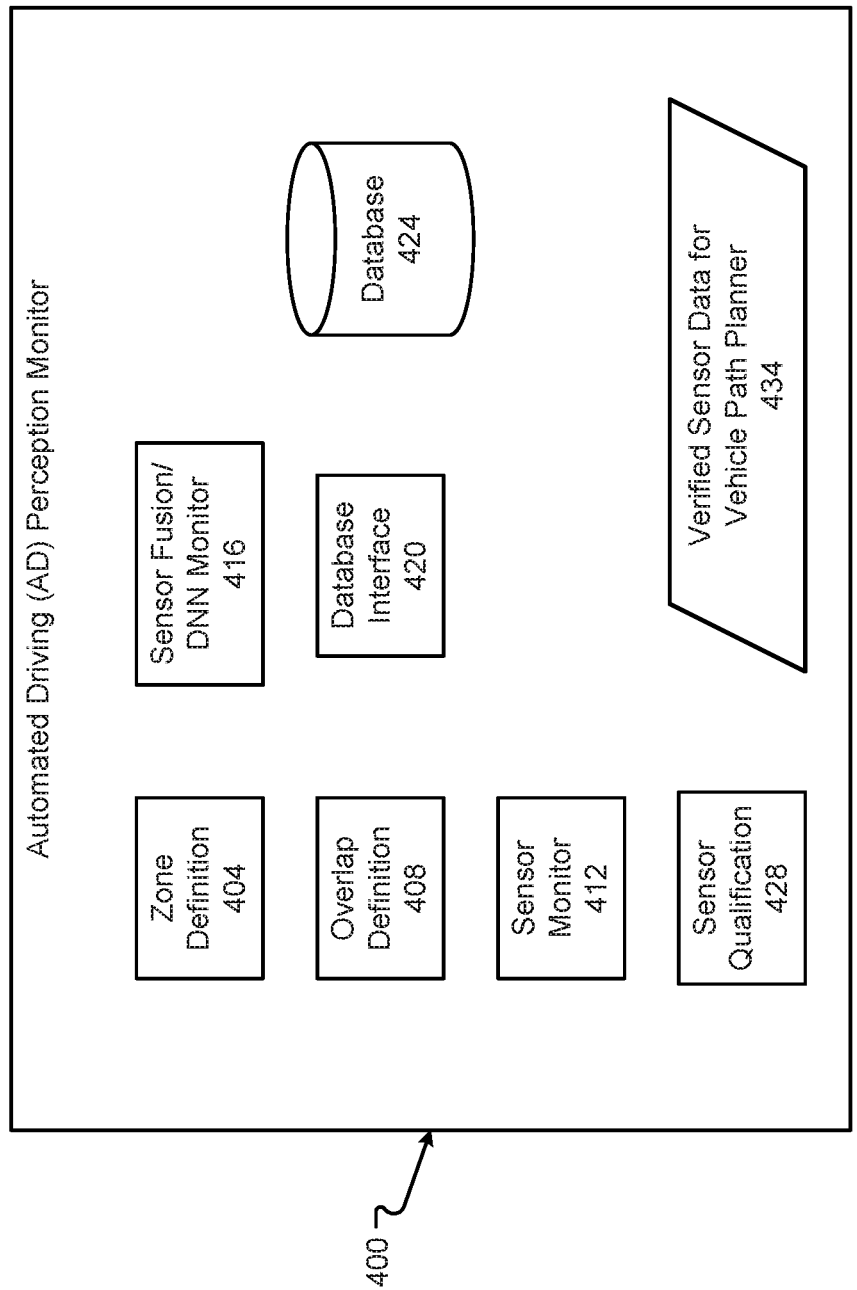
FIG. 4A shows an embodiment of a software/hardware configuration of the vehicle in accordance with at least some embodiments of the present disclosure.

An embodiment of an automated driving (AD) perception monitor 400 that may include hardware and/or software and/or may be executed by or included in the sensor processor 340 may be as shown in FIG. 4A. The sensor control 400 can interface with the driving vehicle sensors 304, as described in conjunction with FIG. 3. The sensor processor 340 may thus include the AD perception monitor 400 functions described herein to define zones and monitor sensors by having individual sensors 304 check other sensors 304 in zones where coverage includes two or more sensors 304. The AD perception monitor 400 can include one or more of, but is not limited to, a zone definition function 404, an overlap definition function 408, a sensor monitor 412, sensor qualification function 428, a sensor fusion/deep neural network (DNN) monitor function 416, a database interface function 420, and/or a sensor monitor 412. The AD perception monitor 400 can output sensor data for the vehicle path planner 434.

Further, in at least some configurations, the AD perception monitor 400 may include or have access to a database 424 which may be included with or part of the sensor data 344. Data stored within the database 424 may be as described in conjunction with FIGS. 8A and 8B. Further, the database 424 can be any database as described in conjunction herein with FIG. 3, FIG. 6, and/or FIG. 7. The database 424 can store data as necessary, retrieve data as necessary, and communicate with the database interface 420 to provide such data to any of the other functions in the AD perception monitor 400.

The database interface 420 can be any type of interface that may both store and/or retrieve data from the database 424. As such, the database interface 420 can queue data, store the data into the database 424, retrieve data from the database 424, and/or provide data to the other functions 404 through 416, and/or 412. Thus, the database interface 420 functions simply as a data interface and communication interface with the database 424, which may be part of a sensor database 344 or other database included or communicated through a communications subsystem 350, through communication network 352, and to some other control source 356*b*/database.

The zone definition function 404 may determine the zones as outlined in FIG. 2B. Thus, the zone definition function 404 can determine the coordinates, extents, delineations, and/or lines 232 through 240 indicated in FIG. 2B that define the range and/or coverage area of a particular sensor 304. The zone definition function 404 may execute an algorithm as provided in FIG. 10 to define the zones. Other algorithms are possible as described herein or as understood in the art for defining the sensor coverage zones.

The overlap definition function 408 can determine where different zones, provided from the zone definition function 404, overlap. In other words, the overlap definition function 408 can determine where two or more sensors cover the same area around the vehicle 100. The overlap definition function 408 may execute an algorithm as described in conjunction with FIG. 11 to determine the overlap areas. Other algorithms are possible as described herein or as understood in the art for defining the overlap regions, including simple correlation methods.

A sensor monitor 412 may determine if a sensor 304 is functioning by determining whether the sensor 304 is indicating the presence of an object within an overlap zone that has coverage of two or more sensors 304 provided from the overlap definition function 408. Thus, the sensor monitor 412 can use one or more other sensors to determine that a first sensor 304 is functioning by determining if the first sensor and the other sensors indicate an object within an overlap zone indicated by letters B through S in FIG. 2B. The sensor monitor 412 may execute an algorithm as described in conjunction with FIG. 12 to determine if a sensor is functioning. Other algorithms are possible as described herein or as understood in the art for determining proper functioning of a sensor 304.

The sensor qualification function 428 may receive indications or data from the sensor monitor 412 to determine if a sensor 304 is functioning. If a sensor is functioning properly, the sensor 304 may be qualified by the sensor qualification function 428. This qualification data may then be stored by the database interface 420 in database 424. The sensor qualification function 428 may also provide this qualification information to the sensor/DNN function 416 and/or sensor monitor 412 to indicate which sensors 304 are suitable for use in the driving environment. The sensor qualification function 428 may execute an algorithm as described in conjunction with FIG. 13. Other algorithms are possible as described herein or as understood in the art for determining which sensors are qualified.

The sensor fusion/DNN monitor function 416 may integrate the information from the sensor monitor 412 in sensor qualification 428 functions. This information integration may allow the sensor fusion/DNN monitor function 416 to better determine which sensors 304 to use during any kind of travel or operation by the vehicle 100, when to ignore certain signal inputs, or to complete other functions. The sensor fusion/DNN monitor function 416 may execute an algorithm as indicated in FIG. 14 for integrating the sensor information. Other algorithms are possible as described herein or as understood in the art for integrating the sensor information.

The sensor monitor 412 can monitor functions of the different sensors 304 periodically, constantly, and/or continuously. As such, the sensor monitor 412 can continuously monitor the overlap areas to determine if sensors 304 are working. Thus, the sensor monitor 412 executes a continuous check of the sensors 304 during driving or while the vehicle 100 is operating to ensure the safest sensor suite and sensor signals possible. The sensor monitor function may execute an algorithm as described in conjunction with FIG. 15 to monitoring sensor functionality. Other algorithms are possible as described herein or as understood in the art for monitoring the functioning of the sensors 304.

Output for the AD perception monitor 400 can include sensor data for the vehicle path planner 434. The data 434 can include a set of sensors or driving environment data that has been verified and/or qualified. In some circumstances, when an issue with a sensor 304

Figure 4B:
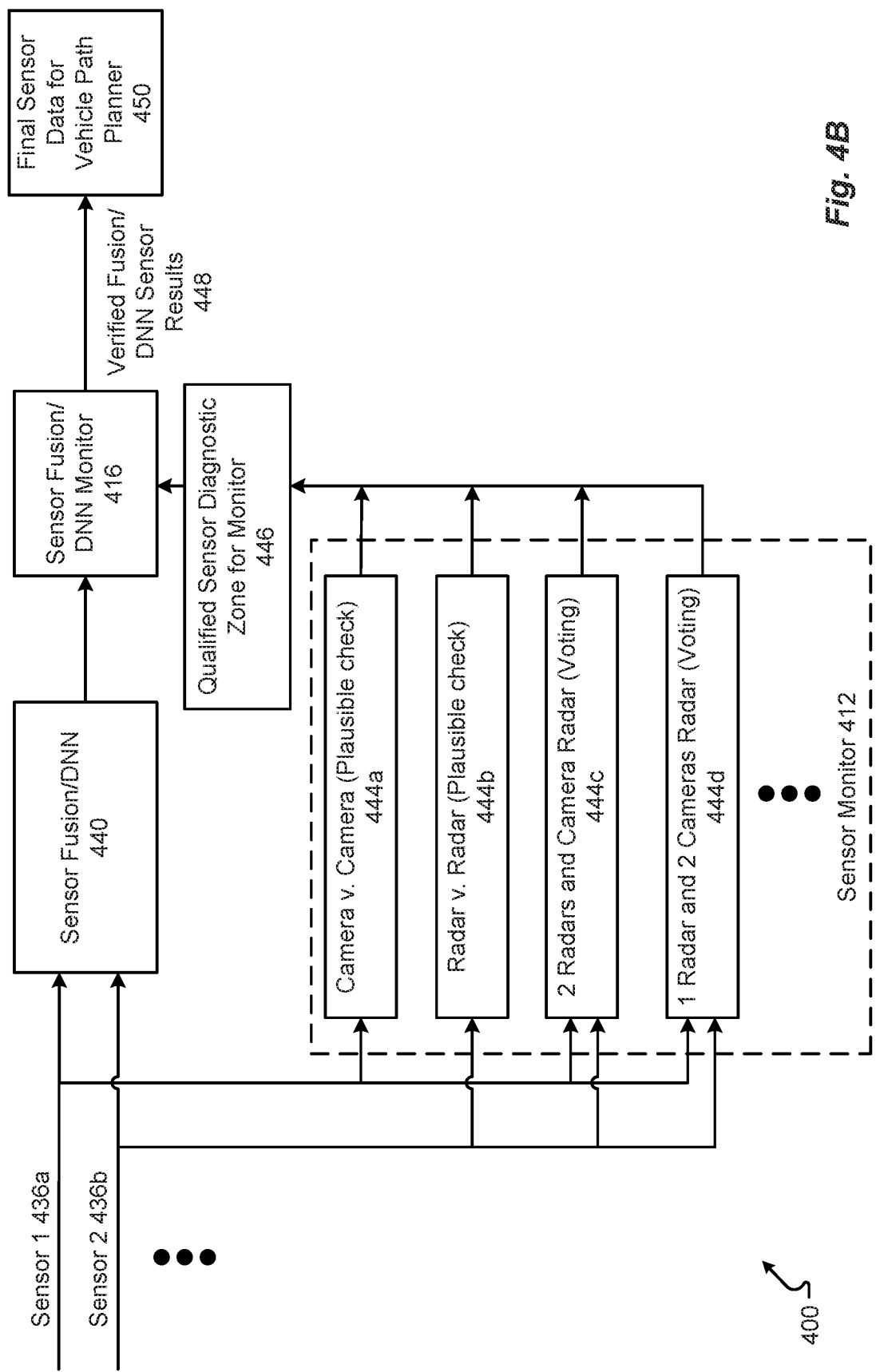
FIG. 4B shows another embodiment of a software/hardware configuration of the vehicle in accordance with at least some embodiments of the present disclosure.

A more functional indication of the functions of the sensor control system 400 may be as described in conjunction with FIG. 4B. As shown in FIG. 4B, two or more sensor signals 436a, 426b may be provided to the AD perception monitor 400. These signals 436 may be provided to a sensor fusion/DNN function 440 and/or the sensor monitor 412. The sensor fusion/DNN function 440 may be the function used to provide navigation assistance and/or automatic driving and automatic control of the vehicle, as described herein. The sensor fusion/DNN function 440 thus takes the various signals 436 from the sensors 304 and fuses it into a signal or information regarding the environment around the vehicle 100 during operation of the vehicle 100. That information may then be used by navigation system 302 or vehicle control system 348 to control or guide the vehicle 100. Further, the vehicle control system 348 may use the fused sensor information to complete automatic driving or other functions for the vehicle 100. Further, the sensor signals 436 may also be provided to a sensor monitor 412.

The sensor control 400 can output sensor data for the vehicle path planner 424. The sensor data for the vehicle path planner 424 can include the verified sensor results that includes all or a portion of sensor information that is qualified for use in path planning. In other configurations, the sensor data for the vehicle path planner 424 can include a set of zones qualified with sensor inputs that can be used by the path planner. Other types of output are possible and included in the sensor data for the vehicle path planner 424 that can be used to control or plan the travel or operation of the vehicle. Regardless, the sensor data for the vehicle path planner 424 can include some form of monitoring or evaluation of the sensor data and indications about how the data has been affected by the monitoring or evaluation of the sensors, as described herein.

The sensor monitor 412 may receive the two or more signals 436 and complete different types of checks or analysis, as shown in FIG. 4B. For example, in zones where two cameras cover the area, for example area G in FIG. 2B, the cameras may determine if an object within zone G is sensed or observed. As such, the camera-versus-camera check may be executed as a sensor check function 444a to determine if both cameras are functioning. In other zones, such as those covered by two radars, such as zone H, a check may be radar versus radar, as shown in function 444b. In some areas, there may be two radars and a single camera that allow for even further detailed checking. For example, in zone Q, there may be two radars and a single camera that allow for two-way voting on indication of an object, as shown in function 444c. Further, there may be circumstances, such as in zone Q, where there may be one radar and two cameras that do two-way voting, as in function 444d. Other tests or evaluations are possible and contemplated.

As such, the sensor monitor 412 can complete different types of checks based on the overlap zone and may provide the resultant information, e.g., the qualified sensor diagnostic zone for monitor data 446 (which can include, in some form, the sensor data for the vehicle path planner 424), about how the checks were completed or executed to the sensor/DNN monitor function 416. The sensor/DNN monitor function 416 may indicate whether there are sensors 304 that are not functioning properly, have failed, are qualified, and/or degraded. In other circumstances were to, the sensor/DNN monitor function 416 can modify the output from the Sensor Fusion/DNN 440. Thus, the sensor fusion signal 440 may be modified by se sensor/DNN monitor function 416 to exclude certain events, zones, or operations that can go to the vehicle control system 348 or navigation system 302. The verified fusion DNN sensor results 448 provide a safer, more accurate indication of the environment for the vehicle 100 for vehicle control. These verified fusion DNN sensor results 448 can form at least a portion of the final sensor data for the vehicle path planner 450 sent to other systems. For example, the verified fusion DNN sensor results 448 can include information about which data is qualified or monitored or may actually eliminate the bad data or zones.

Figure 5:
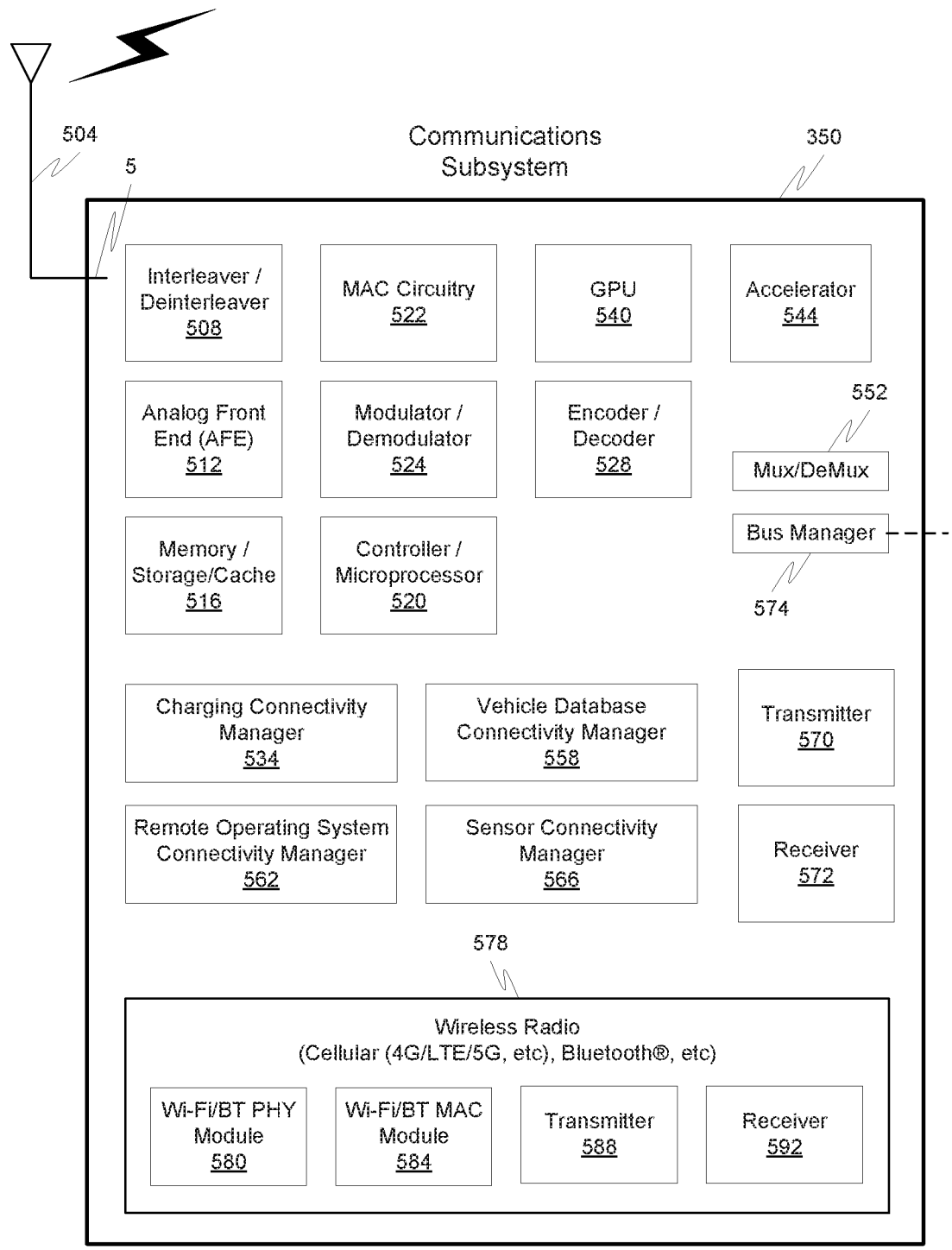
FIG. 5 is a block diagram of an embodiment of a communications subsystem of the vehicle in accordance with at least some embodiments of the present disclosure.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with another vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any if the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and wireless radio 578 components such as a Wi-Fi PHY/Bluetooth® module 580, a Wi-Fi/BT MAC module 584, transmitter 588 and receiver 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long-term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter 570 and receiver 572 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE PHY module 580 and a Wi-Fi/BT/BLE MAC module 584 and wireless transmitter 588 and receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 6:
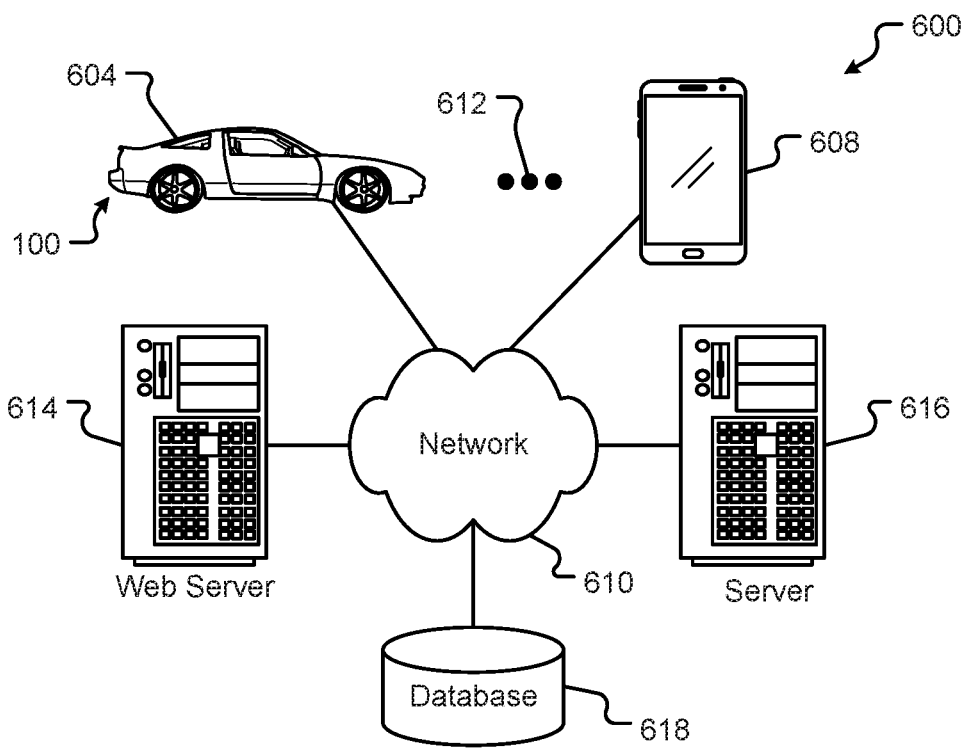
FIG. 6 is a block diagram of a computing environment of the vehicle in accordance with at least some embodiments of the present disclosure.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 610) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7A:
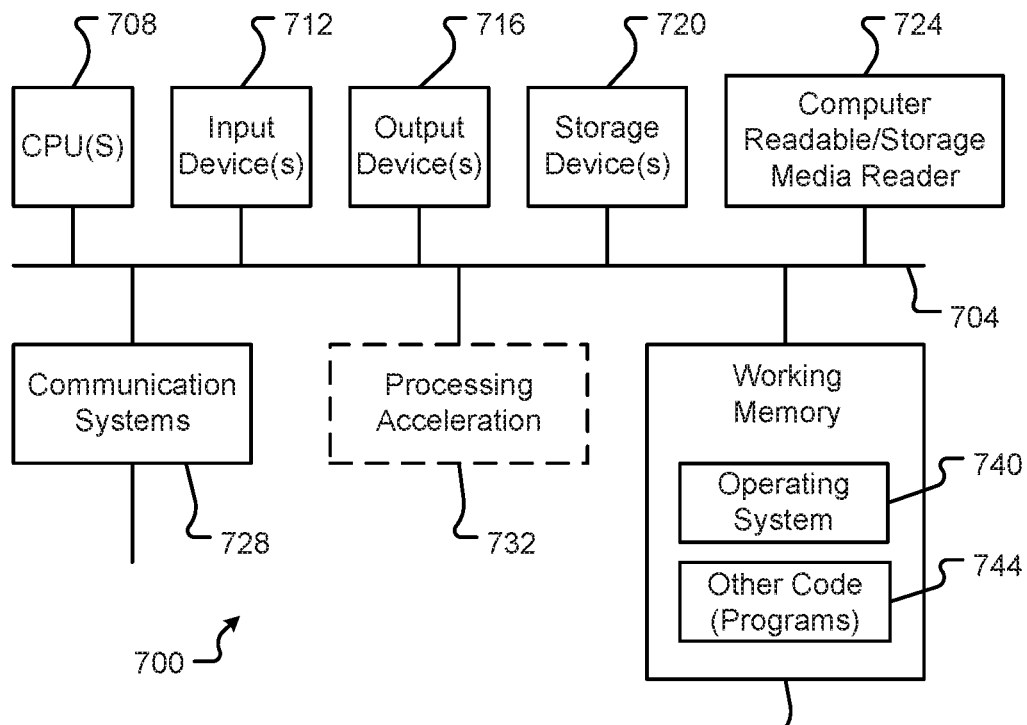
FIG. 7A is a block diagram of a computing device associated with one or more components described herein in accordance with at least some embodiments of the present disclosure.

FIG. 7A illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The vehicle 100 can provide an intelligent autonomous vehicle control system that augments the learned behaviors from autonomous vehicle driving operations with temporally, spatially, or event-limited identified behaviors and other autonomous driving information received from the intelligent autonomous vehicle control system. The temporally, spatially, or event-limited identified behaviors and other autonomous driving information can be learned by the control system monitoring the behaviors of multiple autonomous vehicles or other objects whose behavior is to be modeled by passing autonomous vehicles. The behaviors can be published by the control source by being pushed to selected vehicles and/or attached to navigation information. In this way, the learned behaviors of multiple vehicles can be shared via the control source, thereby decreasing accident rates and increasing vehicle safety.

The intelligent autonomous vehicle control system can embed identified autonomous driving information, such as commands, requests, warnings, logic, instructions, rules, references, identifiers, observed driving behaviors, or links to locally or remote stored autonomous driving rules, logic or instructions, in the navigation information provided by the navigation source 356A. A flag can be included in the navigation information to indicate the existence of such embedded identified autonomous driving information.

A similar ad hoc network can be formed for the purpose of transmitting collected information to the navigation source 356A or control source 356B. A designated or master vehicle in the ad hoc network can transmit certain types of collected information common to multiple vehicles in the network, such as sensed object information and environmental information that are substantially duplicative from vehicle-to-vehicle, to the navigation source 356A or control source 356B while uncommon types of collected information, such as sensed occupant information and vehicle-related information that are not duplicative vehicle-to-vehicle, are transmitted by each vehicle separately.

The intelligent autonomous vehicle control system (e.g., the master vehicle) can form an ad hoc wireless network with surrounding vehicles (e.g., the slave vehicles) and provide the embedded identified autonomous driving information to the networked vehicles. This configuration can reduce significantly the bandwidth requirements to provide by the control source 356B to provide navigation information and embedded identified autonomous driving information to each of the surrounding vehicles. Membership of the ad hoc wireless network and member role can change dynamically as vehicles move in and out of proximity to each other.

Figure 7B:
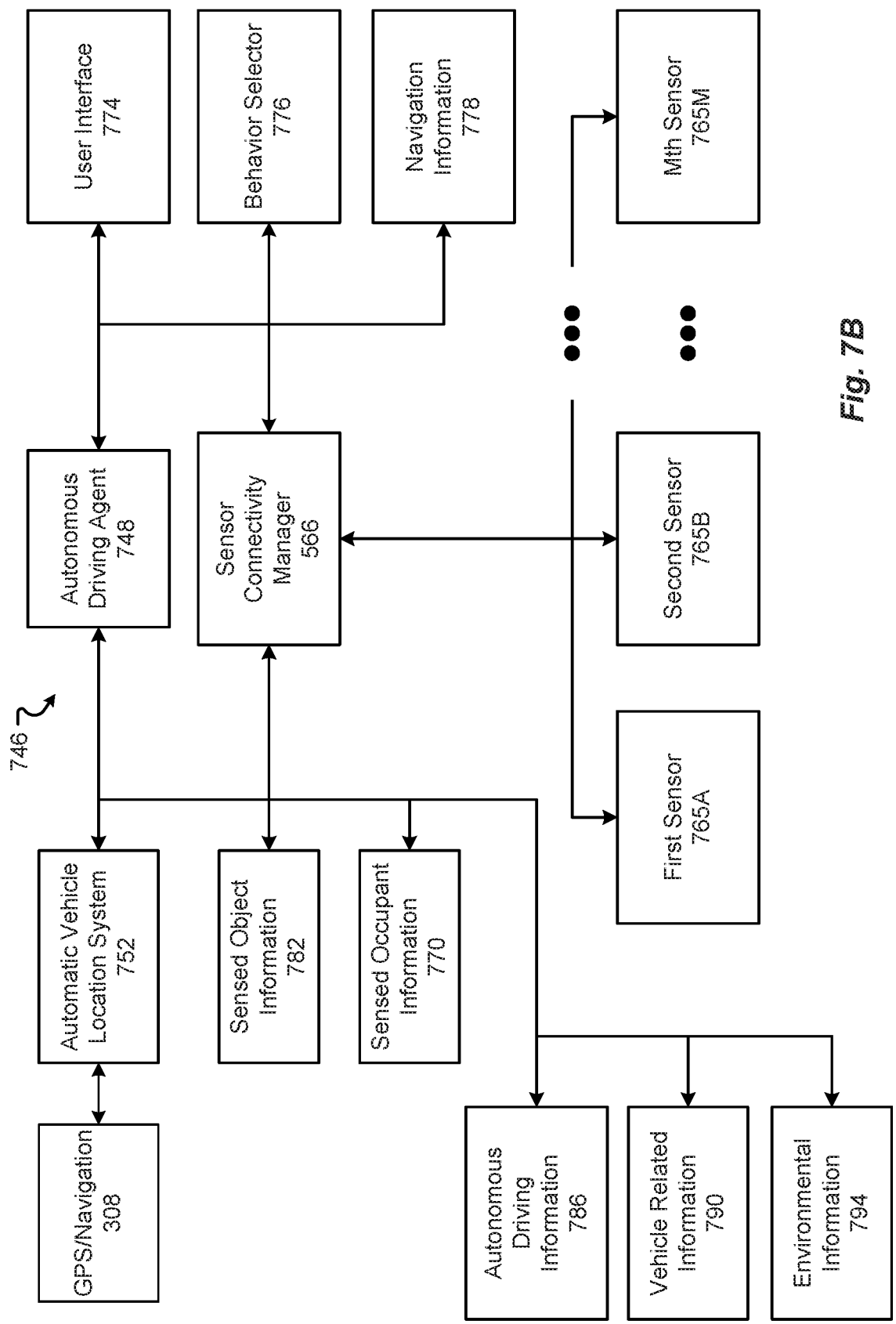
FIG. 7B is a block diagram of an autonomous driving vehicle system in accordance with at least some embodiments of the present disclosure.

With reference to FIGS. 3 and 7B, the vehicle 100 may be in wireless communication, via network 352, with navigation source 356A comprising a map database manager (not shown) and associated map database (not shown) and the control source 356B having an associated control source database (not shown).

The map database manager and map database interact with the navigation sensor 308 (which is part of the automatic vehicle location system 752 discussed below) in the vehicle 100 to provide navigation or map output to an autonomous driving agent 748 in the vehicle 100.

The map database manager stores and recalls navigation information from the map database.

Maps are commonly stored as graphs, or two or three dimensional arrays of objects with attributes of location and category, where some common categories include parks, roads, cities, and the like. A map database commonly represents a road network along with associated features, with the road network corresponding to a selected road network model. Commonly, such a model comprises basic elements (nodes, links and areas) of the road network and properties of those elements (location coordinates, shape, addresses, road class, speed range, etc.). The basic elements are referred to as features and the properties as attributes. Other information associated with the road network can also be included, such as points of interest, waypoints, building shapes, and political boundaries. Geographic Data Files (GDF) is a standardized description of such a model. Each node within a map graph represents a point location of the surface of the Earth and can be represented by a pair of longitude (lon) and latitude (lat) coordinates. Each link can represent a stretch of road between two nodes, and be represented by a line segment (corresponding to a straight section of road) or a curve having a shape that is generally described by intermediate points (called shape points) along the link. However, curves can also be represented by a combination of centroid (point or node), with a radius, and polar coordinates to define the boundaries of the curve. Shape points can be represented by longitude and latitude coordinates as are nodes, but shape points generally do not serve the purpose of connecting links, as do nodes. Areas are generally two- or three-dimensional shapes that represent things like parks, cities, blocks and are defined by their boundaries (usually formed by a closed polygon).

Auxiliary data can be attached by the map database manager to the features and/or attributes. The auxiliary data can be not only various navigational functions, involving active safety, and driver assistance but also identified autonomous driving information relating to an autonomous vehicle or other object to be sensed by passing autonomous vehicles, such as observed behaviors of other autonomous vehicles or an object at the map location, to be applied at the corresponding geographic locations. The auxiliary data, for example, can comprise identified embedded autonomous driving information, such as commands to the receiving autonomous driving agent, requests to the receiving autonomous driving agent, warnings to the receiving autonomous driving agent, (e.g., of potential hazards such as potholes, hazardous objects in or near the roadway, poor roadway conditions (such as icy or wet), heavy traffic warning, emergency vehicle or personnel-related warning, vehicle wreck warning, road construction warning, bridge or roadway out warning, high water or flood warning, and the like) logic, instructions or rules to be employed by the receiving autonomous driving agent, references, identifiers, observed behaviors, or links to locally or remote stored autonomous driving rules, logic or instructions to be employed the receiving autonomous driving agent, in the navigation information provided by the navigation source 356A.

The identified autonomous driving information embedded in the navigation information as auxiliary data can include temporal, spatial, or event-limitations learned by the control system monitoring the behaviors of multiple autonomous vehicles. The identified autonomous driving information can be limited in application by temporal limitations (e.g., identified behavior application start and end times), spatial limitations (e.g., sets of geographical coordinates defining an area in or location at which the identified autonomous driving information is to be applied), or event limitations (e.g., a defined event (such as a weather storm event, ambient temperature range (such as below freezing), set of road conditions, etc.) during which the identified autonomous driving information is to be applied but after which the autonomous driving information is not to be applied).

The auxiliary data fields can include a flag to indicate the existence of such identified embedded autonomous driving information relating to an autonomous vehicle or other object to be sensed by passing autonomous vehicles. When the flag is set, the autonomous vehicle driving agent accesses the field(s) dedicated to identified embedded autonomous driving information and, when the flag is not set, the autonomous vehicle driving agent does not access the field(s) as they are deemed not to contain identified autonomous driving information.

The functions and other auxiliary data can be cross-referenced with the entities and attributes of the main map database. Since the auxiliary data is not necessarily compiled with the main map database some other means is generally needed to establish cross-referencing, or attaching of the auxiliary data. The common approaches are function-specific referencing tables and generic referencing.

Function-specific referencing tables provide a technique for attaching function-specific data, such as embedded identified autonomous driving information relating to an autonomous vehicle or other object to be sensed by passing autonomous vehicles, to the map database. Such a table can be collaboratively produced by the navigation source 356A and control source 356B to support a specific function or class of functions involving location-based behaviors or embedded identified autonomous driving information. It will generally include a list of map elements of a specific type (e.g., links, intersections, point-of-interest locations, etc.) along with identifying attributes (e.g., street names, longitude/latitude coordinates, etc.). Additionally, each entry in the table can be assigned a unique identifier. As a practical matter, the result will represent a small subset of the elements of the given type that are available in the map databases and will include those that are more important to the application area.

Generic referencing attaches data, such as observed behaviors and embedded identified autonomous driving information relating to an autonomous vehicle or other object to be sensed by passing autonomous vehicles, to any map database by discovering reference information through a form of map matching. The function-specific data items can be assigned to elements, such as points, links or areas, that likely only approximate the corresponding map elements in a specific map database. A search of the map database can be made for the best fit. To enhance the search process, neighboring elements can be strategically appended to each given element to help ensure that the correct solution is found in each case. For example, if the map element is a link connecting two intersections, then one or both cross streets could be appended for the sake of the search thereby making an incorrect match unlikely.

By way of illustration, the Navigation Data Standard (NDS) is a standardized format for automotive-grade navigation databases. NDS uses the SQLLite Database File Format. An NDS database can have several product databases, and each product database may be divided further into update regions. This concept supports a flexible and consistent versioning concept for NDS databases and makes it possible to integrate databases from different database suppliers into one NDS database. The inner structure of databases complying with Navigation Data Standard is further characterized by building blocks, levels and the content itself. An update region represents a geographic area in a database that can be subject to an update. All navigation data in an NDS database belongs a specific building block. Each building block addresses specific functional aspects of navigation, such as names for location input, routing, or map display.

Alternatively, the control source 356B can push the identified autonomous driving information directly to the autonomous driving agent based on the selected vehicle location and not incorporate or reference the identified autonomous driving information in the navigation information.

The control source 356B and control source database interact with the autonomous driving agent 748 in each vehicle 100 to receive various types of information regarding vehicle behavior and the behaviors of nearby objects, such as other vehicles and pedestrians, identify specific behaviors and other autonomous driving information, and directly or indirectly provide the autonomous driving information to selected vehicles for use in determining and selecting various autonomous vehicle commands or settings, particularly acceleration rate of the vehicle, deceleration (e.g., braking) rate of the vehicle, steering angle of the vehicle (e.g., for turns and lane changes), and inter-object spacing (e.g., end-to-end or side-to-side spacing between the vehicle and a nearby object).

The map and control source databases and can be constructed according to any data model, whether conceptual, logical, or physical, such as a flat model, hierarchical model, network model, relational model, object-relational model, star schema, entity-relationship model, geographic model, generic model, semantic model, and the like.

Each learned or identified behavior (or other autonomous driving information) is described typically by output behavior and associated with a corresponding set of limitations. By way of illustration, the output behavior is typically a driving behavior of the car, such as use a specified lane, slow to a selected speed, gently apply brakes, turn lights on, use inter-vehicle spacing of X meters, transition from a lower level of automation to a higher level or vice versa, and the like. The learned or identified behavior can be further described with reference to a set of sensed inputs.

The sensed inputs can vary by corresponding object type but include one or more of geographic or spatial vehicle location, sensed object information 782 (with examples being animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like), sensed occupant information 770 (with examples being number and identities of occupants and attributes thereof (e.g., seating position, age, sex, gaze direction, biometric information, authentication information, preferences, historic behavior patterns (such as current or historical user driving behavior, historical user route, destination, and waypoint preferences), nationality, ethnicity and race, language preferences (e.g., Spanish, English, Chinese, etc.), current occupant role (e.g., operator or passenger), occupant priority ranking (e.g., vehicle owner is given a higher ranking than a child occupant), electronic calendar information (e.g., Outlook™), medical information and history, etc.), selected vehicle-related information 790 (with examples being vehicle manufacturer, type, model, year of manufacture, current geographic location, current vehicle state or activity (parked or in motion or level of automation currently employed), vehicle specifications and capabilities, currently sensed operational parameters for the vehicle, and other information), exterior environmental information 794 (with examples being road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like), occupant commands or other input, and other information.

The identified behavior or other autonomous driving information can be based on observations of repetitive behavior of multiple vehicles observed at a specific map location or area or in response to an event (e.g., any of the sensed object information 782 or sensed environmental information 794) or during a specified time-of-day.

The application or usage of the identified behavior can be limited temporally, spatially, or by occurrence or duration of an event. While the application or usage of the identified behavior is permitted by the corresponding limitation, the identified behavior and other autonomous driving information is used instead of learned behaviors and other autonomous driving information of the vehicle. When the application or usage of the identified behavior and other autonomous driving information is not permitted by the corresponding limitation (e.g., the vehicle is outside the spatially limited area, the time duration of the behavior is expired, or the event has terminated or otherwise ended), the learned behavior and other autonomous driving information of the vehicle is employed.

An on board autonomous driving system or vehicle path planner 746 in the vehicle 100 may employ one or more of the foregoing features, as shown in FIG. 7B. The autonomous driving system or vehicle path planner can include an autonomous driving agent 748 in communication with an automatic vehicle location system 752, sensor connectivity manager 566 and associated first, second, . . . Mth sensors 765a-M, user interface 774, and authentication system (not shown), and having access via working memory 736 or communication systems 728 to the sensed object information 782, sensed occupant information 770, learned autonomous driving information 786, vehicle-related information 790, exterior environmental information 794, and navigation information 778.

The automatic vehicle location system 752 is in communication with the GPS/Navigation sensor 308 to acquire current vehicle position coordinates, which position coordinates are then correlated by the map database manager to a position on a road. Dead reckoning using distance data from one or more sensors attached to the drive train, a gyroscope sensor 312 and/or an accelerometer sensor 312 can be used for greater reliability, as GPS signal loss and/or multipath can occur due to the map database manager, such as due to a cellular signal dead or low signal strength area or passage of the vehicle through a tunnel.

The first, second, . . . mth sensors 765a-m can collect the sensed object information 782, sensed occupant information 770, vehicle-related information 790, and exterior environmental information 794. The first, second, . . . mth sensors 765a-m include the sensors or systems 116A-K, 112, 312, 316, 320, 324, 328, 332, 336, and 338 discussed above, a camera to capture images of interior objects (such as occupants), a seat belt sensor to determine seat belt settings (e.g., closed or open), a seat weight sensor settings, a microphone to capture audio within the vehicle (such as occupant comments which are then input into a speech-to-text engine to determine or identify one or more words spoken by an occupant), a wireless network node that receives unique identifiers of occupant portable computing devices (which identifiers can be associated with a corresponding occupant to identify the occupant), and the like. In some applications, a portable computing device of the occupant can be employed as a sensor that tracks occupant behavior while the occupant is in the vehicle. The information collected by the sensors is received by the sensor connectivity manager 566 and provided to the autonomous driving agent 748 and/or to the control source 356B.

The user interface 774 receives user commands and other input, such as user selections, preferences, and settings that are used in configuring, determining, and selecting vehicle parameters, settings, or operations, such as navigation route selection, acceptable rates of acceleration and deceleration, acceptable minimum inter-object spacing distance, and acceptable steering lines, and stimuli or events triggering associated rule-based actions. The user interface 774 can be one or more of vehicle instrument panel, vehicle operational display, heads-up display, power management display, etc. It can also be a portable computational or communication device of an occupant.

The behavior selector 776 determines which behavior logic and other autonomous driving information is to be employed by the vehicle. The behavior selector 776 can determine therefore which locally stored (e.g., in working memory 736) learned behavior or other autonomous driving information 786 is to be executed or implemented and which identified or learned behavior of other autonomous driving information is to be executed or implemented.

The autonomous driving agent 748 controls the driving behavior of the vehicle, such as whether to execute an accelerate event, acceleration rate, decelerate event, deceleration rate, steering angle selected relative to a selected reference axis, and selected inter-object spacing magnitude in response to the current vehicle location, sensed object information 782, sensed occupant information 770, vehicle-related information 790, exterior environmental information 794, and navigation information 778 in accordance with the autonomous driving information selected by the behavior selector 776 and implemented by the autonomous driving agent 748. In a typical implementation, the autonomous driving agent, based on feedback from certain sensors, specifically the camera, the LIDAR, and radar sensors positioned around the circumference of the vehicle, constructs a three-dimensional map in spatial proximity to the vehicle that enables the autonomous driving agent to identify and spatially locate animate and inanimate objects. Other sensors, such as inertial measurement units, gyroscopes, wheel encoders, sonar sensors, motion sensors to perform odometry calculations with respect to nearby moving objects, and exterior facing cameras (e.g., to perform computer vision processing) can provide further contextual information for generation of a more accurate three-dimensional map. The navigation information is combined with the three-dimensional map to provide short, intermediate and long range course tracking and route selection. The autonomous driving system processes real-world information as well as GPS data, and driving speed to determine accurately the precise position of each vehicle, down to a few centimeters all while making corrections for nearby animate and inanimate objects.

The autonomous driving agent 748 processes in real time the aggregate mapping information and models behavior of occupants of the current vehicle and other nearby animate objects relying on the behavior selector's selected autonomous driving information. The autonomous driving information can be generically applied to multiple types, models, and manufacturer of vehicles or specific to a specific type, model, or manufacturer of vehicle. The applicability of the respective set of identified autonomous driving information can be stored as part of the data structures comprising the identified autonomous driving information.

In some applications, the behavior selector 776 selects between learned and identified autonomous driving information for a nearby object in the sensed object information 782. The selected autonomous driving information is used to model the behavior of the nearby object and therefore determining a behavior of the selected vehicle to be implemented by the autonomous driving agent.

The autonomous driving agent, based on the learned and autonomous driving information, issues appropriate commands regarding implementing an accelerate event, acceleration rate, deceleration event, deceleration rate, inter-object spacing distance, and steering angle magnitude. While some commands are hard-coded into the vehicle, such as stopping at red lights and stop signs, other responses are learned and recorded by the control source or autonomous driving agent based on previous driving experiences.

The learning ability of the control source is based on monitoring the behavior of multiple vehicles and of the autonomous driving agent is based on monitoring the behavior of the selected vehicle hosting the autonomous driving agent. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

As more and more vehicles drive the selected route of the selected vehicle, sensor collected information of the vehicle can be provided in substantial real time to the map database manager to enable it to generate a detailed three-dimensional map as the navigation information. This in effect uses each vehicle as a mapping information source to enable detailed and accurate three dimensional maps to be developed. If every vehicle were to provide this collected information, however, bandwidth constraints and limitations would create problems not only for transmission of the collected information but also for other communication services, such as cell phone bandwidth.

One solution is to form ad hoc wireless networks of vehicles to reduce the bandwidth consumed by reporting of the collected information by multiple nearby vehicles. The ad hoc wireless network can be formed to accommodate peer-to-peer communications not only for the purpose of transmitting collected information to but also receiving navigation information and autonomous driving information from the navigation source 356A and/or control source 356B. A designated or master vehicle in the ad hoc network can transmit certain types collected information common to multiple vehicles in the network, such as sensed object information and environmental information that are substantially duplicative from vehicle-to-vehicle, to the navigation source 356A or control source 356B while uncommon types of collected information, such as sensed occupant information and vehicle-related information that are not duplicative vehicle-to-vehicle, are transmitted by each vehicle separately. Likewise, the designated or master vehicle in the ad hoc network can receive the navigation information or autonomous driving information and transmit all or part of it to multiple vehicles in the network.

As will be appreciated, a wireless ad hoc network (WANET) is a decentralized type of wireless network. It is ad hoc because it does not rely on a pre-existing infrastructure. A wireless ad-hoc network, also known as IBSS—Independent Basic Service Set, is a computer network in which the communication links are wireless. The network is ad-hoc because each node can forward data for other nodes, and so the determination of which nodes forward data is made dynamically based on a number of factors, such as token possession, network connectivity, spatial location, and the like.

By way of example, the wireless ad hoc network can be a vehicular ad hoc network or VANET. VANETs can provide communication between vehicles. Intelligent vehicular ad hoc networks (InVANETs) are a kind of artificial intelligence that helps vehicles to behave in an intelligent manner or cooperatively. Radio waves can be used to enable vehicle inter-communication but other wireless communication modalities, channels, and protocols can be employed.

The wireless ad hoc network can be based on other mechanisms, such as mobile ad hoc networks (MANETs), smartphone ad hoc networks (SPANs), and Internet-based mobile ad hoc networks (iMANETs). Wireless ad hoc networks can beneficially provide networking that does not require expensive infrastructure, that uses an unlicensed frequency spectrum, that provides a quick distribution of information, and that does not have a single point of failure.

To overcome problems caused by the frequent breakage or disconnection and reconnection of links due to the high mobility of the nodes a cross-layer design can be provided that deviates from the traditional network design approach in which each layer of the stack would be made to operate independently. A modified transmission power can help a node to dynamically vary its propagation range at the physical layer. This is because the propagation distance is generally directly proportional to transmission power. This information is passed from the physical layer to the network layer so that it can make optimal decisions in routing protocols. This protocol can allow access of information between physical layer and top layers (MAC and network layer).

Different routing protocols can be employed. In distance vector routing, each vehicle or node maintains one or more dynamically updated routing tables. Distance-vector protocols are based on calculating the direction and distance to any link in a network. "Direction" usually, means the next hop address and the exit interface. "Distance" is a measure of the cost to reach a certain node. The least cost route between any two nodes is the route with minimum distance. Each node maintains a vector (table) of minimum distance to every node. The cost of reaching a destination is calculated using various route metrics. RIP uses the hop count of the destination whereas IGRP takes into account other information such as node delay and available bandwidth. In reactive routing, the node finds a route based on user and traffic demand by flooding the network with Route Request or Discovery packets. Clustering of the vehicles can be used to limit flooding. In flooding, every incoming packet is sent through every outgoing link except the one it arrived on. In hybrid routing, routing is initially established with some proactively prospected routes and then serves the demand from additionally activated nodes through reactive flooding. In position-based routing, information on the exact locations of the nodes is obtained for example via a GPS receiver. Based on the exact location, the best path between source and destination nodes can be determined.

To reduce collisions caused by nodes competing for the shared wireless medium, centralized scheduling or distributed contention access protocols can be used. Using cooperative wireless communications can improve immunity to interference by having the destination node combine self-interference and other-node interference to improve decoding of the desired signals.

The ad hoc wireless network can be formed in many ways. For example, the particular vehicles in the network at any time can be based on one or more factors, including spatial location or proximity, received signal strength for signals received from other vehicles to be included in the network, direction of travel, nature of roadway (e.g., divided or not, number of lanes, etc.), vehicle type, model or manufacturer, and other factors appreciated by one of skill in the art.

To avoid inter-vehicle conflicts as to which vehicle in the network is the master vehicle within the ad hoc network, an arbitration process can be employed. The arbitration process can be based on any technique known in the art for other applications, including ownership of a token, earliest timestamp of receiving selected navigation or autonomous driving information, oldest timestamp of membership in the network, nearest vehicle to the relevant feature or location for the selected navigation or autonomous driving information, vehicle route selected, and the like.

Membership of the ad hoc wireless network and member role can change dynamically as vehicles move in and out of proximity to each other. Vehicles therefore can send notifications that they are leaving the network or requests to be admitted to the network. The network can be substantially fixed at a set of spatial map coordinates or move with a designated master vehicle. As will be appreciated, multiple ad hoc networks generally exist at any one time involving different sets of vehicles with different sets of members. A vehicle is generally a member of only one of the many ad hoc networks used by the control source and navigation source To avoid duplication, the master vehicle sends notifications to the navigation source 356A or control source 356B identifying (by electronic address or other unique identifier) which vehicles in the ad hoc wireless network (a) acknowledged receipt of the selected navigation information or autonomous driving information to avoid duplicate transmission of the information by the appropriate one of the navigation source and control source or (b) acknowledged receipt of notification that certain types of collected information would be transmitted by the master vehicle and not by the other vehicle in the network.

The autonomous driving agent can be configured to handle other autonomous operations, regardless of automation level. Examples include adaptive cruise control, lane keeping, parking functions, and the like.

Embodiments of different data structures that may be included in sensor control data, in database 424, may be as shown in data 800, in FIGS. 8A and 8B. FIG. 8A includes a data structure 804, which includes different types of sensor information. This data structure 804 can include one or more of, but is not limited to, a sensor identifier (ID) 808, a sensor type 812, sensor zones 816, sensor qualification 820, and/or other metadata 824. There may be more or fewer fields than those shown in FIG. 8A, as indicated by ellipses 832. Further, there may be a data structure 804 for each sensor in the vehicle 100. As such, there may be more data structures 804 than those shown in FIG. 8A, as represented by ellipses 828.

The sensor identifier (ID) 808 can include an identification or information available to identify a sensor 304. This sensor ID 808 can include one or more of, but is not limited to, a numeric ID, an alphanumeric ID, a globally unique identifier (GUID), a uniform resource locator (URL), a media access control (MAC) address, or some other type of identifying information for the sensor 304. This information 808 uniquely identifies the sensor 304 from all other sensors 304 in the vehicle 100.

A sensor type 812 can identify the type of sensor 304. For example, the sensor type 812 can be a camera sensor, a sound sensor, an infrared sensor, a radar sensor, an ultrasonic sensor, etc. The different sensor types 812 can be as described in conjunction with FIG. 3. The sensor type 812 may also include any type of information regarding the operation of the sensor 304, including its abilities, sensitivity, etc.

A sensor zone 816 can be a definition of the zone (as described in conjunction with FIGS. 2A and 2B), in which the sensor 304 is operational or configured. The sensor zone 816 can include a three-dimensional description of the zone. This three-dimensional description can include coordinates, angle measurements, distance from a set point, etc. The sensor zone 816 may thus be able to provide a mathematical definition of the range, the width of sensing field, the height of the sensing field, etc. Further, the sensor zone 816 can define from a fixed and predetermined point on, within, or associated with the vehicle 100 indicating from where the sensor zone focusses or projects. In this way, the sensor zone 816 can be compared to other sensor zones 816 from other sensors to determine where there is overlap.

Sensor qualification data 820 can be a determination of whether the sensor 304 is qualified in a certain zone or at all. Sensor qualification 820 thus may be a simple YES/NO or bit that is set if the sensor 304 is qualified or, in some instances, where the sensor 304 is unqualified. This sensor qualification 820 may then be relied upon to determine whether or not the sensor 304 should be used for the navigation system 302 or the vehicle control system 348.

Other information may be provided about the sensor or may be included in the metadata 824. As such, metadata 824 may include any other information about the sensor 304 that may be needed to establish overlap definitions to determine if the sensor 304 is functioning or should be qualified or disqualified.

Another data structure 836, which may be used to determine zonal coverage and the operation of sensors within zones around the vehicle 100, may be as shown in FIG. 8B. The fields within the data structure 836 may include one or more of, but is not limited to, a zone ID 840, a zone definition 844, a sensor coverage 848, qualified sensors/zones 852, overlap definition 856, and/or rules 860. There may be more or fewer fields than those shown in data structure 836, as represented by ellipses 864. Each zone or area around the vehicle 100 that may have a particular characteristic, may have a separate data structure 836. Thus, FIG. 8B may have two or more data structures 836, as represented by ellipses 868.

A zone ID 840 can be any type of identifier or identifying information similar in form and/or type to the sensor ID information 808. For example, the zone ID 840 can include a numeric, alphanumeric, GUID, or other types of ID. The zone ID 840 uniquely identifies the zone around the vehicle 100 (for example, as shown by zones "B"-"S" in FIG. 2B) compared to all other zones surrounding the vehicle 100.

The zone definition 844 can include any type of three-dimensional data or configuration information, for the zone, that defines the shape of the zone. For example, the one or more zones, as shown in FIG. 2B, may each have a specific zone definition 844. The zone definition 844 may include information about how one or more sensors covers the zone, for example, that a first sensor has a particular field of scan vertically and/or horizontally. Thus, the zone definitions 844 can be employed to determine whether the sensors 304 covering those zones are functioning properly. The zone definition 844 can include a range, a height of the zone, a width of the zone, a distance from a common point in the vehicle 100, etc. The zone definition 844 may be similar in structure to the sensor zone 816, but may be only a portion of the sensor zone 816, as defined in data structure 804, and may indicate where a different number of sensors can sense object together, where only a single sensor may sense, and/or where no sensor may search. Thus, wherever there is a different configuration of sensors that can sense an object in a particular region around the vehicle 100, a new zone definition 844 is created.

Sensor coverage 848 is a listing of the one or more sensors 304, identified by sensor ID 808, that are able to sense objects within the zone defined by zone definition 844. As such, the sensor coverage 848 may include one or more sensor IDs 808. In this way, the sensors 304 covering the zone, defined by zone definition 844, can be cross-checked when an object is in the zone.

Qualified sensors/zones information 852 can include which sensors 304, derived from sensor coverage 848, are qualified to sense objects within the zone. Thus, the qualified sensors information 852 may be a list including all or fewer sensors than as provided in sensor coverage 848. The qualified sensors information 852 can include the one or more sensor IDs in sensor coverage 848 but eliminate any sensor that is listed as unqualified by sensor qualification information 820. In other embodiments, only unqualified sensors may be listed in qualified sensors information 852, thus acknowledging that any other sensor not listed in the sensor coverage list 848 is a qualified sensor.

In another configuration, the qualified zone information is defined. In other words, instead of listing which sensors are qualified in a zone, the zone itself is either qualified or unqualified. Thus, if one or more sensors that cover a particular zone are unqualified, the zone itself may be unqualified. Any sensed object information associated with an unqualified zone can be ignored and/or discarded. Thus, the qualified zone information 852 can include one or more zone IDs 840 for either the qualified or unqualified zones.

Overlap definition 856 may be an indication of whether the zone, defined by zone definition 844, is an overlap region. In this way, the sensor control processor 400 can quickly look for the regions, by the overlap indication 856, to check the functioning of the sensors. Thus, all sensors that only have a single sensor, for example, the regions in FIG. 2B designated by the identifier "A", are eliminated. This information shortens the processing time for the AD perception monitor 400 to find which zones to do cross-checking. The overlap definition 856 may thus include any zone ID 840 where two or more sensors cover the area, as provided in the sensor coverage information 848. In other configurations, the overlap definition 856 is a binary indicator of whether there is sensor overlap or not.

A rules section 816 may include what type of voting or other processes are used to check the functioning of the sensors within a zone. As such, if an overlap is indicated in field 856 for the zone defined in field 844, the rules 860 can provide what type of checks may be done. Rules can include plausibility checks, two-way voting, other types of diagnostic checks, etc. These rules may be provided by the sensor control processor 400 to the sensor monitor 412 to determine the functionality of the sensors.

The operations of the various executable modules will now be discussed with reference to FIGS. 9-15.

Figure 9A:
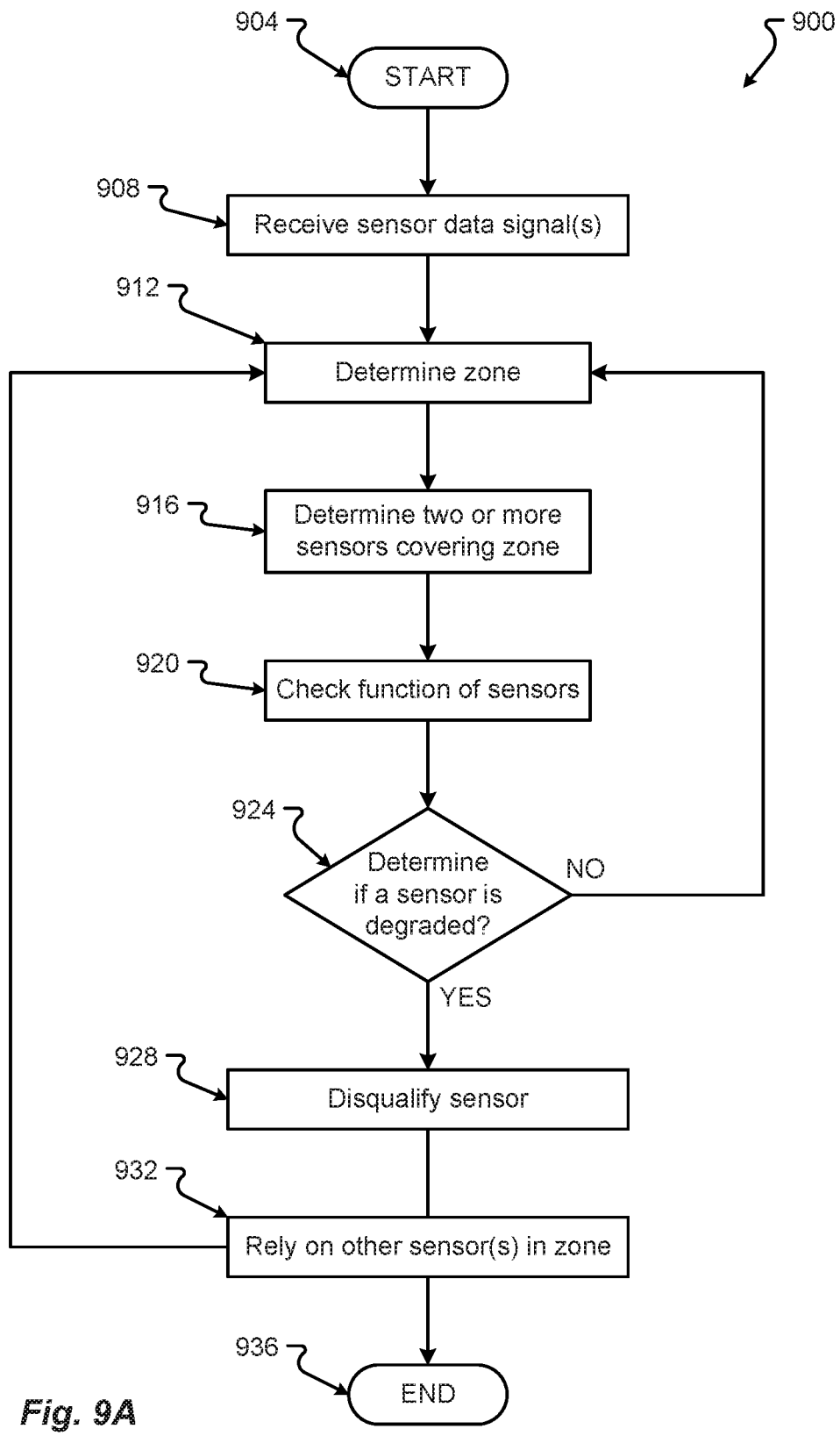
FIG. 9A is a flow chart associated with one or more embodiments presented herein.

An embodiment of a method 900 for determining the operability of sensors in real time for the vehicle 100 may be as shown in FIG. 9A in accordance with embodiments of the present disclosure. A general order for the steps of the method 900 is shown in FIG. 9A. Generally, the method 900 starts with a start operation 904 and ends with operation 936. The method 900 can include more or fewer steps or can arrange the order of the steps differently than those shown in FIG. 9A. The method 900 can be executed as a set of computer-executable instructions executed by a computer system or processor and encoded or stored on a computer readable medium. In other configurations, the method 900 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 900 shall be explained with reference to the systems, components, circuits, modules, software, data structures, signaling processes, models, environments, vehicles, etc. described in conjunction with FIGS. 1-8B and 9B-15.

The sensor processor 340 may receive sensor data signals, in step 908. The sensor data signals, e.g., signals 436, may be provided from driver vehicle sensors 304 to the sensor processor 340. These signals 436 may be received by the sensor processor 340 as separate signals, e.g., signals 436*a*, 463*b*, etc. These sensor signals 436 may then be provided to the sensor control processor 400 for processing of sensor checks.

A zone definition function 404 may determine zones, in step 912. The zone definition function 404 may use the received sensor signals 436 to determine a zone or may retrieve the zone definition 840 from sensor data 344. The zone definition function 404 may then determine which zone may be reviewed at the present instance and provide that zone ID 840 to the overlap definition function 408. One example of a method for determining the zones, for step 912, as conducted by the zone definition function 404, may be as provided in method 1000 in FIG. 10.

Overlap definition function 408 can then determine two or more sensors covering a zone, in step 916. In other words, the overlap definition function 408 can determine which zones have overlap of two or more sensors. The overlap definition function 408 may have previously created the overlap definitions that were stored in field 856 or designated those overlap zones by setting a bit in field 856 previously. In such situations, the overlap definition function 408 may retrieve the zone definitions 844 with the overlap definitions 856 to provide to the sensor monitor 412. In other embodiments, the overlap definition function 408 may determine or create the overlap definitions or indications, for example, by executing process 1100 described in FIG. 11.

The sensor monitor 412 may check the function of the sensors 304, in step 920. The sensor monitor 412 may execute one or more rules, provided in rules field 860, to determine whether one or more sensors 304, within an overlap zone, are functioning incorrectly, have degraded, or have had some other change in the functionality of the sensor 304. This sensor monitor 412 can execute the process 1200 described in conjunction with FIG. 12 for determining the function of the sensors 304. This information may then be provided to the sensor qualification function 428.

The sensor qualification function 428 may then determine if a sensor is degraded, in step 924. A degraded function of the sensor 304 may be determined in, for example, process 1300 described in conjunction with FIG. 13. A degradation of a sensor 304 may include the process of determining an object sensed by one sensor within an overlap zone is also detected by the other sensor(s). Other types of rules 860 may also be executed to determine if there is a problem with a degraded sensor. This information is generally provided by the sensor monitor 412. If there is no degradation of a sensor 304, the process 900 proceeds NO back to step 912 to determine another zone around the vehicle 100. In this way, the process 900 is iterative and can continually check all zones sequentially or in parallel during the operation of the vehicle 100. If a sensor 304 is degraded, the process 900 proceeds YES to step 928 where the sensor qualification function 428 can disqualify a sensor. A degraded sensor may be disqualified by setting or changing the sensor qualification indication, provided in field 820. The disqualification of the sensor may then be announced to other functions not to use any information from the disqualified sensor. The disqualification of a sensor may also be as described in conjunction with, for example, process 1400 described in conjunction with FIG. 14A or process 1436 described in conjunction with FIG. 14B.

The information provided by the sensor qualification function 428, sensor monitor 412, or other types of functions or systems may be provided then to the sensor Fusion/DNN monitor 416 and/or the sensor monitor 412. This provided information may then indicate to the sensor Fusion/DNN monitor 416 to rely on other sensors for the zone defined by zone 844, in step 932. The sensor Fusion/DNN monitor 416 may perform the functions described as process 1500 in FIG. 15 to disqualify or change the sensor fusion results from sensor fusion operation 440 to provide verified fusion DNN sensor results 448. This change may include discarding sensor information from disqualified sensors and/or disqualified zones.

Figure 9B:
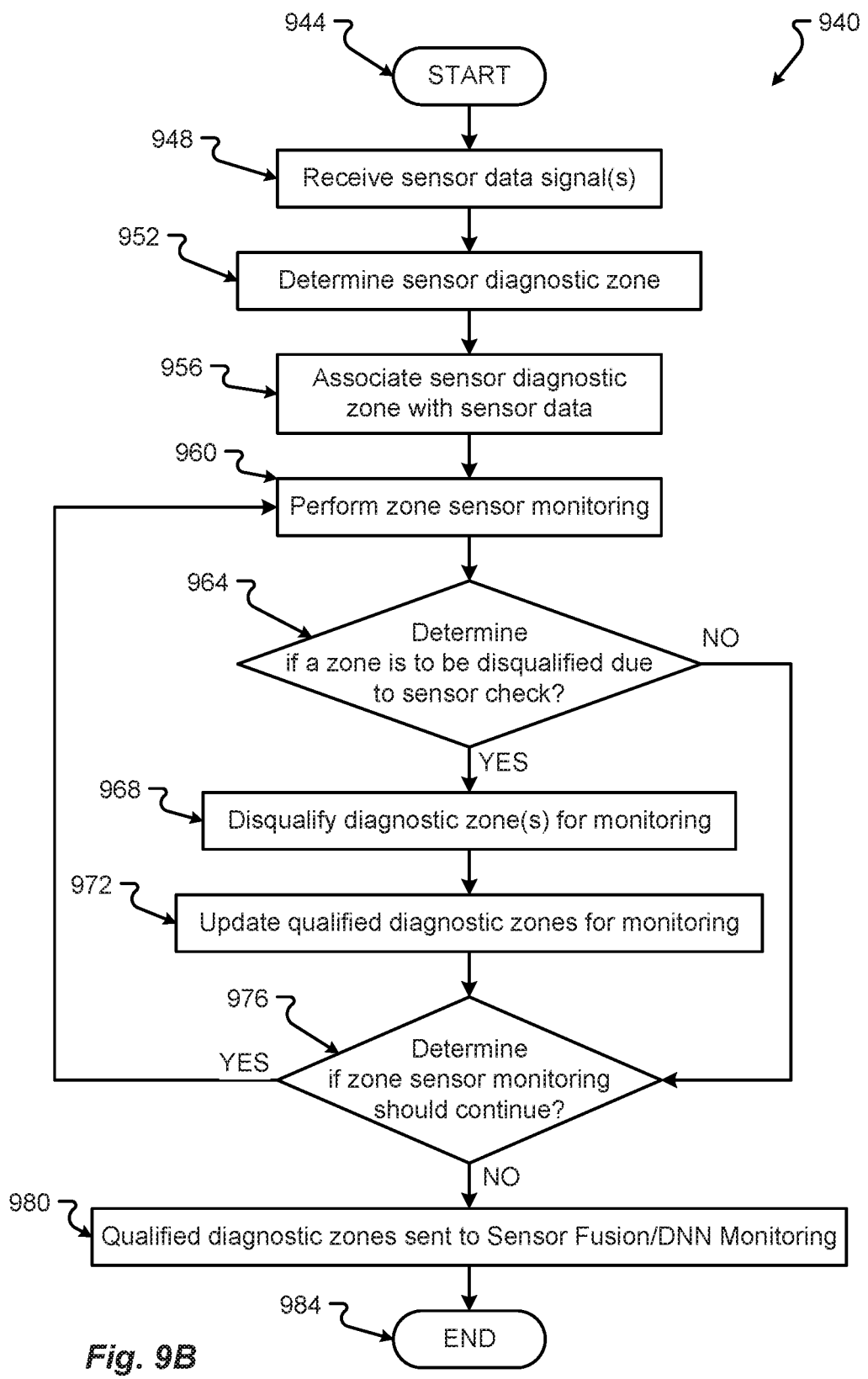
FIG. 9B is a flow chart associated with one or more embodiments presented herein.

Another embodiment of a method 940 for determining the operability of sensors in real time for the vehicle 100 may be as shown in FIG. 9B in accordance with embodiments of the present disclosure. A general order for the steps of the method 940 is shown in FIG. 9B. Generally, the method 940 starts with a start operation 944 and ends with operation 984. The method 940 can include more or fewer steps or can arrange the order of the steps differently than those shown in FIG. 9B. The method 940 can be executed as a set of computer-executable instructions executed by a computer system or processor and encoded or stored on a computer readable medium. In other configurations, the method 940 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 940 shall be explained with reference to the systems, components, circuits, modules, software, data structures, signaling processes, models, environments, vehicles, etc. described in conjunction with FIGS. 1-9A and 10-15.

The sensor processor 340 may receive sensor data signals, in step 948. The sensor data signals, e.g., signals 436, may be provided from driver vehicle sensors 304 to the sensor processor 340. These signals 436 may be received by the sensor processor 340 as separate signals, e.g., signals 436a, 463b, etc. These sensor signals 436 may then be provided to the sensor control processor 400 for processing of sensor checks.

A zone definition function 404 may determine and/or update sensor diagnostic zones, in step 952. The zone definition function 404 may use the received sensor signals 436 to update a zone used for sensor diagnostics based on a retrieved zone definition 840 from sensor data 344. The zone definition function 404 may then determine how a zone may have changed based on changes in the sensors at the present time and provide the updated zone definitions and the zone ID 840 to the overlap definition function 408. One example of a method for updating the zones, for step 912, as conducted by the zone definition function 404, may be as provided in method 1000 in FIG. 10.

Overlap definition function 408 can then associate the sensor data signals with the updated zones, in step 956. In other words, the overlap definition function 408 can determine which zones have overlap of two or more sensors and determine the sensors that are associated with the zone. The overlap definition function 408 may have previously created the overlap definitions that were stored in field 856 or designated those overlap zones by setting a bit in field 856 previously. In such situations, the overlap definition function 408 may retrieve the zone definitions 844 with the overlap definitions 856 and sensor IDs 804 to provide to the sensor monitor 412. In other embodiments, the overlap definition function 408 may determine or create the overlap definitions or indications, for example, by executing process 1100 described in FIG. 11.

The sensors 304 may then perform in the zones and be monitored. The sensor monitor 412 may check the function of the sensors 304, in step 960. The sensor monitor 412 may execute one or more rules, provided in rules field 860, to determine whether one or more sensors 304, within an overlap zone, are functioning incorrectly, have degraded, or have had some other change in the functionality of the sensor 304. This sensor monitor 412 can execute the process 1200 described in conjunction with FIG. 12 for determining the function of the sensors 304. This information may then be provided to the sensor qualification function 428.

The sensor qualification function 428 may then determine if a zone is to be disqualified, in step 964. A degraded function of the sensor 304 and/or a zone disqualification may be determined in, for example, process 1300 described in conjunction with FIG. 13. A degradation of a sensor 304 or zone may include the process of determining an object sensed by one sensor within an overlap zone is also detected by the other sensor(s). Other types of rules 860 may also be executed to determine if there is a problem with a degraded sensor. This information is generally provided by the sensor monitor 412. If there is no degradation of a sensor 304 or zone, the process 940 proceeds NO to step 976 to determine if another zone around the vehicle 100 should be checked. In this way, the process 940 can be iterative and can continually check all zones sequentially or in parallel during the operation of the vehicle 100. If a sensor 304 is degraded and/or a zone is disqualified, the process 940 proceeds YES to step 968 where the sensor qualification function 428 can disqualify a zone. A degraded zone may be disqualified by setting or changing the sensor qualification indication, provided in field 852. The disqualification of the zone may then be announced to other functions not to use any information from the disqualified zone. The disqualification of a zone may also be as described in conjunction with, for example, process 1400 described in conjunction with FIG. 14A or process 1436 described in conjunction with FIG. 14B.

The information provided by the sensor qualification function 428, sensor monitor 412, or other types of functions or systems may be updated in step 972. The data in data structures 804 and/or 836 may be updated based on the above process(es) by the database interface 420. The sensor controller 400 may then determine if the zone sensor monitoring should continue, in step 976. If more zones need to be evaluated, the method 940 may proceed YES back to step 960. If all zones have been checked, the method 940 may proceed NO to step 980.

Importantly, the list of qualified zones 852 is updated and may be provided then to the sensor Fusion/DNN monitor 416 and/or the sensor monitor 412, in step 980. This provided information may then indicate to the sensor Fusion/DNN monitor 416 and/or the sensor monitor 412 to rely on other sensors for the zone defined by zone 844. The sensor Fusion/DNN monitor 416 may perform the functions described as process 1500 in FIG. 15 to disqualify or change the sensor fusion results from sensor fusion operation 440 to provide verified fusion DNN sensor results 448. This change may include discarding sensor information from disqualified zones.

Figure 10:
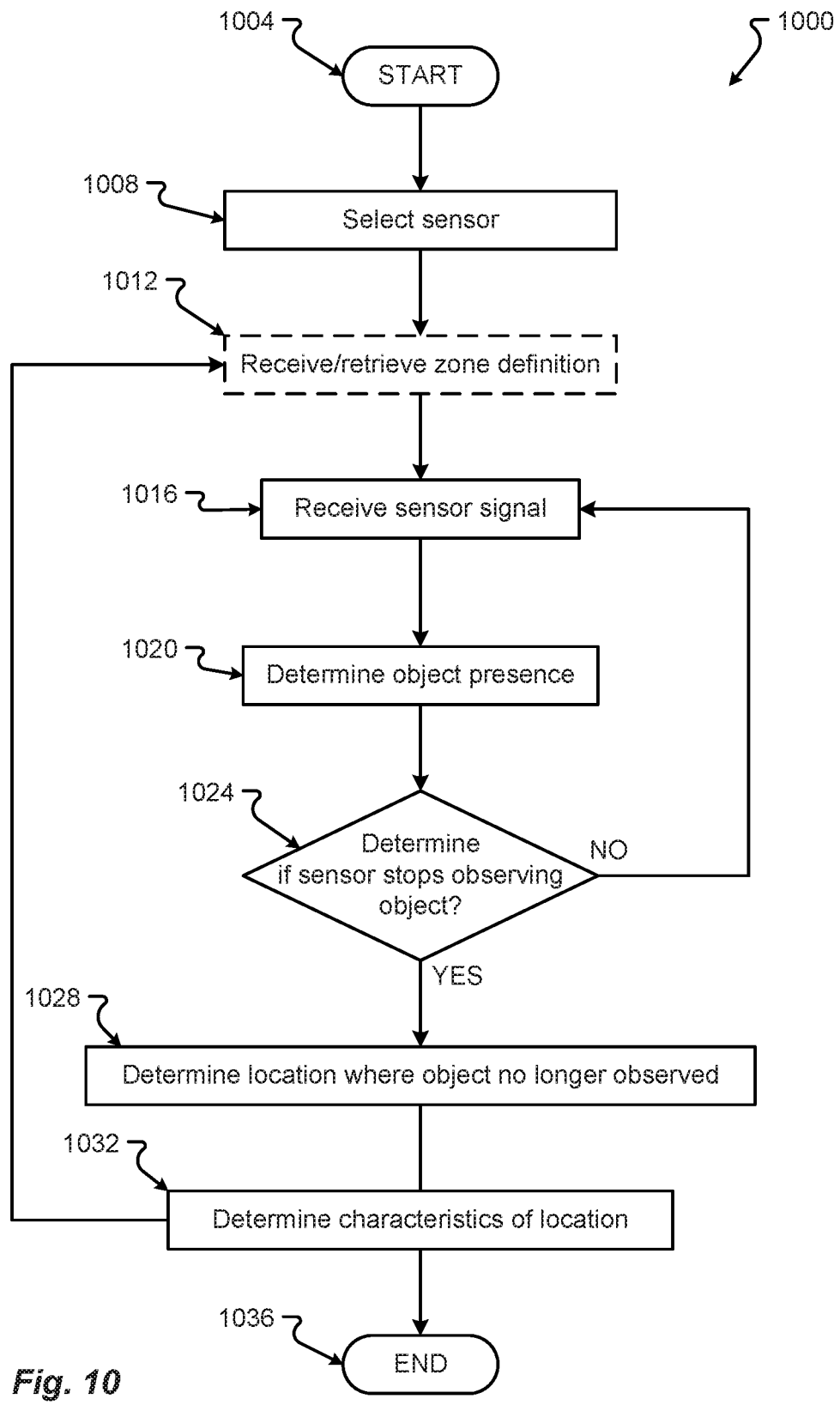
FIG. 10 is a flow chart associated with one or more embodiments presented herein.

A method 1000 conducted by the zone definition function 404 for defining zones may be as shown in FIG. 10 in accordance with embodiments of the present disclosure. A general order for the steps of the method 1000 is shown in FIG. 10. Generally, the method 1000 starts with a start operation 1004 and ends with operation 1036. The method 1000 can include more or fewer steps or can arrange the order of the steps differently than those shown in FIG. 10. The method 1000 can be executed as a set of computer-executable instructions executed by a computer system or processor and encoded or stored on a computer readable medium. In other configurations, the method 1000 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1000 shall be explained with reference to the systems, components, circuits, modules, software, data structures, signaling processes, models, environments, vehicles, etc. described in conjunction with FIGS. 1-9B and 11-15.

The zone definition function 404 can select a sensor 304, identified by a sensor ID 808 provided in a data structure 804, in step 1008. The zone definition function 404 can sequentially select sensors 304 to determine the zone definitions for each of those sensors 304. Upon selecting a sensor 304 identified by sensor ID 808, the zone definition function 404 can retrieve or receive zone definition information (possibly as provided in definition 844 of data structure 840), in step 1012. In some configurations, the zone definition function 404 can be preloaded with zone definitions built by a manufacturer of the vehicle 100. Additionally or alternatively, the information from a manufacturer of the sensor 304 may be provided for zone definitions, with alignment or other characteristics, to the zone definition function 404. In this way, an initial set of zone definitions or characteristics may be provided to speed the process of determining the actual zone definition for the sensor 304 after installation of the sensor 304 in the vehicle 100. The provided zone definition(s) may be initially loaded into zone definition field 844 and then associated with the sensor 304, by the sensor ID 808, in data structure 804 by including the sensor 304 in sensor coverage 848. In other examples, the zone definition initially may be provided in metadata 824 or sensor zone information 816 for the sensor 304, in data structure 804.

The zone definition function 404 may then receive a sensor signal 436, in step 1016. One of the sensors, as part of the sensor group 304, may send a signal 436 to the zone definition function 404 or sensor control processor 400. The sensor control 400 can provide the sensor signal 436 to the zone definition function 404. In other embodiments, the zone definition function 404 may request a certain sensor signal 436 from the sensor control 400, which may filter out other sensor signals and provide only the sensor signal 436 requested by the zone definition function 404.

The sensor definition function 404 may then determine an object present in the zone by a change in the signal information 436, in step 1020. The object presence information may be monitored continually. At some point thereinafter, the zone definition function 404 can determine if a sensor 304 stops observing the object, in step 1024. Thus, the sensor definition function 404 is looking for a horizon or place in the sensor field of view or sensing field where the object is no longer sensed. That location defines an edge of the zone of functionality for the sensor 304. If the zone definition function 404 determines that the sensor 304 is not observing the object anymore, the method 1000 proceeds YES to step 1028. In contrast, if the zone definition function 404 determines that the sensor 304 is continuing to sense the object, the method 1000 proceeds NO back to step 1016 to continue to receive the signal in an iterative process until the object reaches the boundary of the sensing field for the sensor 304. In this way, the zone definition function 404 can define what locations are horizons or demarcation points at which the sensor stops working and the field of observation for the sensor 304 is reached.

The zone definition function 404 then can determine a location where the object was no longer observed 1028 based on sensor signal information 436 that provides where the object was sensed and a location and/or orientation of that sensor 304. In this way, the zone definition function 404 can produce a global location or location information associated with the vehicle 100 rather than the sensor 304 alone. This location information may then be stored as zone definition information 844, sensor zone information 816, and/or in metadata 824.

The location information may then be provided or stored to determine the characteristics of the location, in step 1032. These characteristics can include an elevation from the ground provided or indicated by an angle at which the object was sensed compared to a viewing angle of the sensor, a range from the sensor, a horizontal, vertical, or location other based on an XYZ coordinate system, etc. All these characteristics may define the edge of the zone. After several iterations of the process going from step 1032 back to step 1012, the zone definition function 404 can determine the complete zone for each sensor 304 and store that information.

Figure 11:
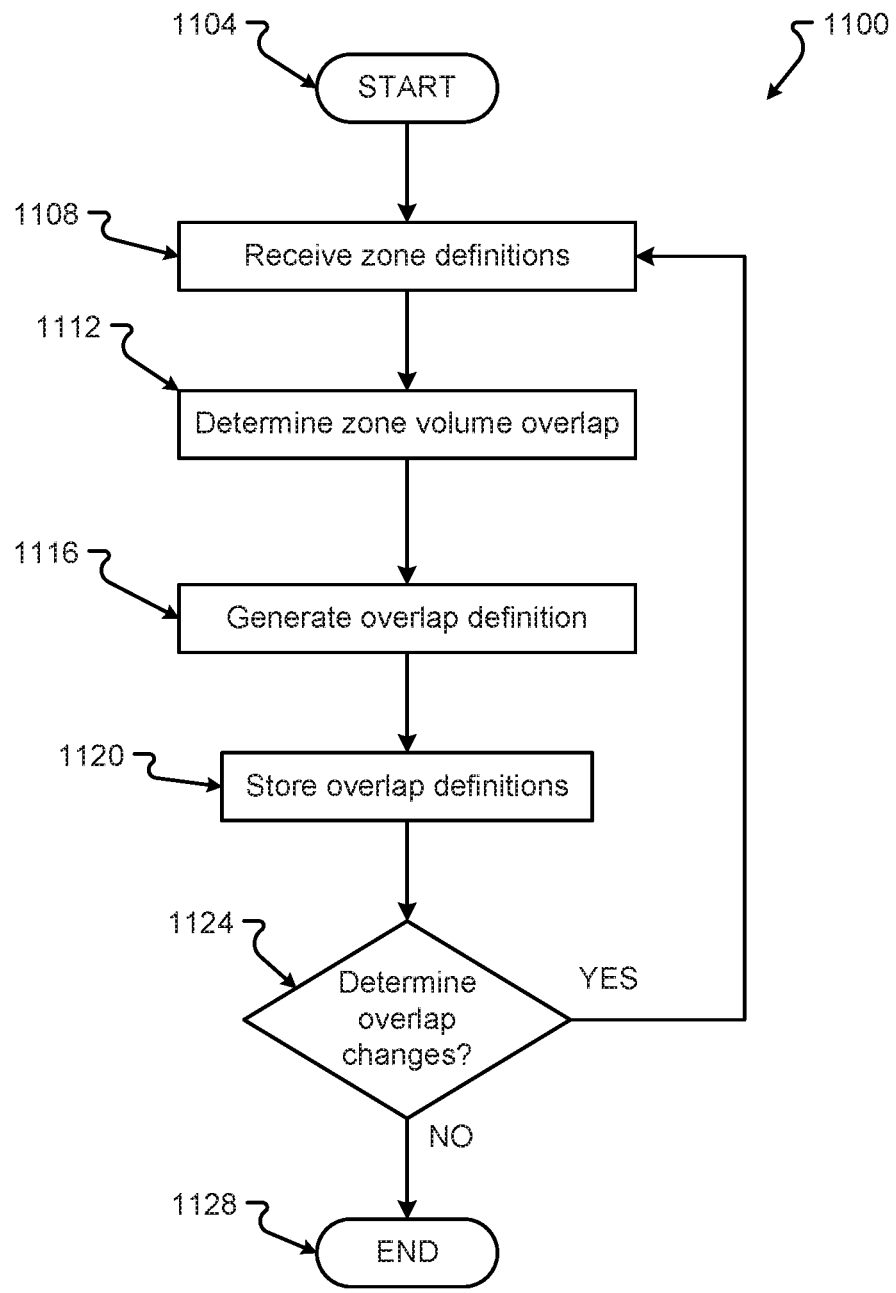
FIG. 11 is a flow chart associated with one or more embodiments presented herein.

A method 1100 for determining which zones overlap with two or more sensors may be as shown in FIG. 11 in accordance with embodiments of the present disclosure. A general order for the steps of the method 1100 is shown in FIG. 11. Generally, the method 1100 starts with a start operation 1104 and ends with operation 1128. The method 1100 can include more or fewer steps or can arrange the order of the steps differently than those shown in FIG. 11. The method 1100 can be executed as a set of computer-executable instructions executed by a computer system or processor and encoded or stored on a computer readable medium. In other configurations, the method 1100 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1100 shall be explained with reference to the systems, components, circuits, modules, software, data structures, signaling processes, models, environments, vehicles, etc. described in conjunction with FIGS. 1-10 and 12-15.

The overlap definition function 408 may receive zone definitions, in step 1108. The overlap definition function 408 can retrieve the zone definitions 816, 844, as determined by the zone definition function 404, from data structure(s) 804 and/or 836. In other embodiments, the overlap definition function 408 may retrieve the zone definitions from metadata 824 that indicate the zones for each sensor 304.

Based on the information for the zones for the different sensors 304, the overlap definition function 408 can determine zone overlap, in step 1112. By comparing the common coordinate or location information for the zone definitions provided by the zone definition function 404, the overlap definition function 408 can determine where the zones cross or the boundaries overlap. In other words, the overlap definition function 408 can determine those zones, shown in FIG. 2B, not indicated by an "A."

The overlap definition function 408 can then generate a definition of where these overlap areas are by specifying the locations or defining those areas B through S that have coverage from two or more functions or sensors 304. These overlap areas may be mutually exclusive, as each overlap zone has different location characteristics and different types or numbers of sensors that can cover the overlap area.

Each one of the small overlap areas may then be given a location definition for range, height, vertical dimensions, etc. Thus, the definition of the volume of space may be defined by the overlap definition function 408 and stored in the overlap definitions, in zone definition 844 and overlap definition 856, in step 1120. The overlap definition function 408 can create a new zone ID 840 and define the zone characteristics 844. The zone defined by the overlap definition function 408 may be the zone, B through S, that has overlap. The overlap indication is set in field 856. As such, the overlap definition function 408 can create the data structure 836 but may not be able to provide each field in the data structure 836.

The overlap definition function 408 may iteratively review the different zones and determine if the overlap changes, in step 1124. The overlap may change by the disqualification of a sensor 304, by the removal of a sensor 304, by the addition of a sensor 304, by a change in the range or profile characteristics of a sensor 304, etc. If any change occurs, such indication may be given by the sensor control processor 400 to the overlap definition function 408 to redo the overlap definitions. If there have been changes, the process 1100 may proceed YES back to receiving zone definitions in step 1108. If no overlap changes occur, the method 1100 may proceed NO to end process 1128.

Figure 12:
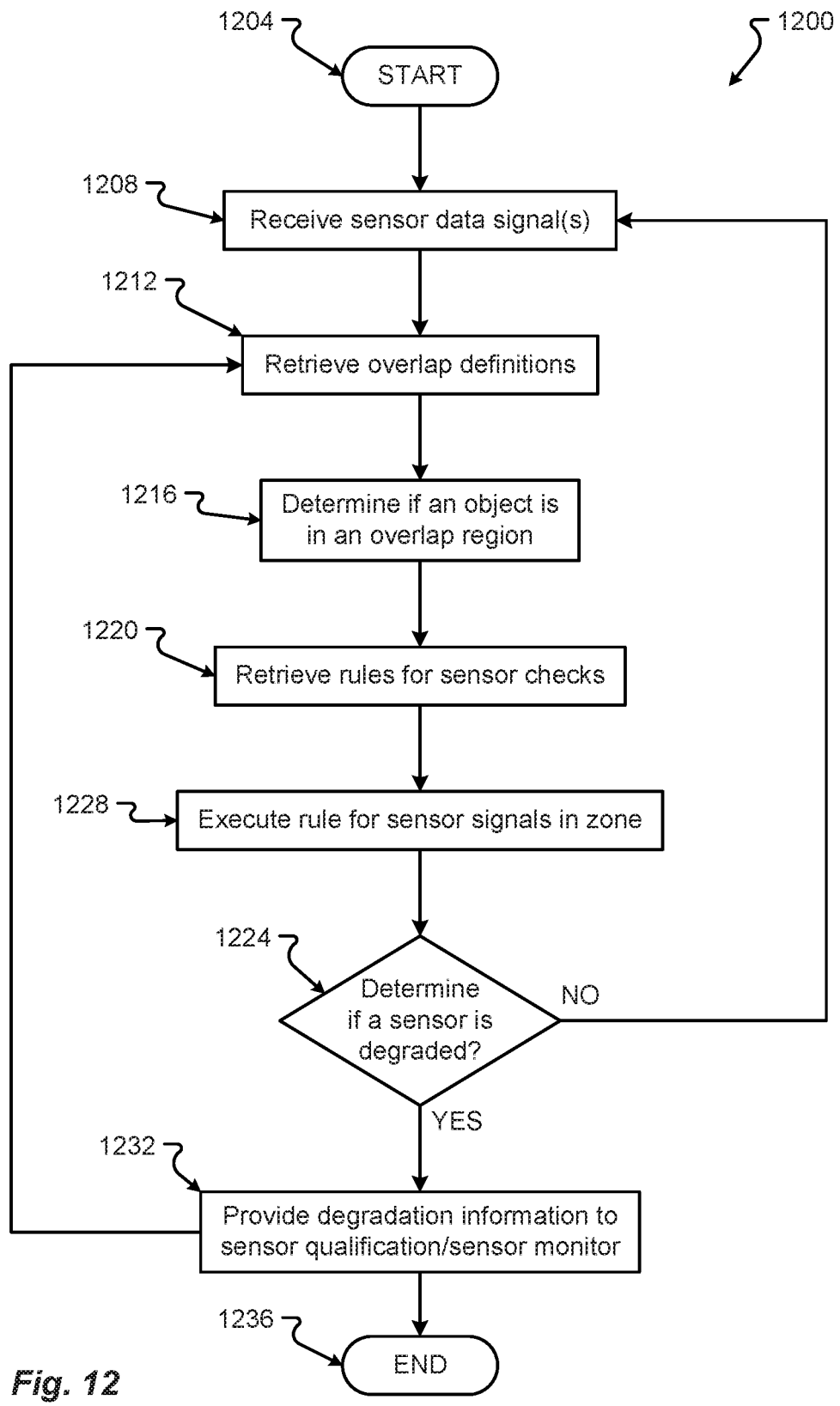
FIG. 12 is a flow chart associated with one or more embodiments presented herein.

An embodiment of a method 1200 conducted by the sensor monitor 412 for checking sensors for degradation may be as shown in FIG. 12 in accordance with embodiments of the present disclosure. A general order for the steps of the method 1200 is shown in FIG. 12. Generally, the method 1200 starts with a start operation 1204 and ends with operation 1236. The method 1200 can include more or fewer steps or can arrange the order of the steps differently than those shown in FIG. 12. The method 1200 can be executed as a set of computer-executable instructions executed by a computer system or processor and encoded or stored on a computer readable medium. In other configurations, the method 1200 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1200 shall be explained with reference to the systems, components, circuits, modules, software, data structures, signaling processes, models, environments, vehicles, etc. described in conjunction with FIGS. 1-11 and 13-15.

The sensor signals may be provided from driver vehicle sensors 304 to the sensor processor 340. The sensor control processor 400 may then provide the sensor signals, as sensor signals 436, to the sensor monitor 412, in step 1208. The sensor monitor 412 can then receive the data signals and complete any check functions for each of the sensors 304 and/or zones.

The sensor monitor 412 may then retrieve the overlap definitions 856 from data structures 836, in step 1212. The sensor monitor 412 can determine which data structures 836 define an overlap zone by checking the overlap definition 856. For those data structures with the overlap indication set, the sensor monitor 412 can retrieve the zone definitions 844 and sensor coverage information 848.

The sensor monitor 412 can then determine, by the sensor signal information 436, if there is an object in an overlap region, in step 1216. For example, the object may be provided or may exist in the environment in one or more of the zones B through S. If an object is in an overlap zone, the sensor monitor 412 can retrieve rules 860 to do the sensor checks, as described in FIG. 4B, in step 1220. The rules may be one or more of, but are not limited to a plausibility check, three-way voting, or other types of checks. The rules can be retrieved and then executed, in step 1228.

A sensor monitor 412 can execute the one or more rules associated with the zone data structure 836 while the object is in the zone. These rules may then determine if all sensors 304 perceive the object in the zone. If, based on the rule, one or more sensors are not sensing the object, the sensor monitor 412 may proceed to determine, in step 1224, if the sensor 304 is degraded or non-functional. If the sensor monitor 412 determines that the sensor 304 is not perceiving the object in the zone, the sensor monitor 412 can determine if that object is outside the view area or if there is a malfunction with the sensor 304. If the sensor is malfunctioning or degraded for some reason, the method 1200 proceeds YES to step 1232. If there is no degradation because the sensor sees the object or there is another issue with why this sensor 304 cannot perceive the object, such as a temporary blockage of the sensor's signal based on another object being in the object's sensing field or some other situation, the method 1200 proceeds NO back to step 1208 to receive sensor signals again either from the same sensor 304 or a different sensor 304 to continue the checking function.

In step 1232, the sensor monitor 412 provides the degradation information to the sensor qualification function 428 and/or the sensor monitor 412. This information can include the sensor ID 808, the zone information in data structure 836, and any type of degradation information determined by the sensor monitor 412, for example, if the sensor 304 does not appear to be operating. The method 1200 may then proceed back to retrieve another overlap definition 1212. In this way, the process is iterative for each sensor 304 on the vehicle 100 and/or for all zones. Thus, the sensor monitor 412 continually operates to determine in real time the continued safety and operation of all the sensors 304 in all zones and allow the vehicle 100 to adjust as needed if a sensor 304 is determined to be degraded.

Figure 13:
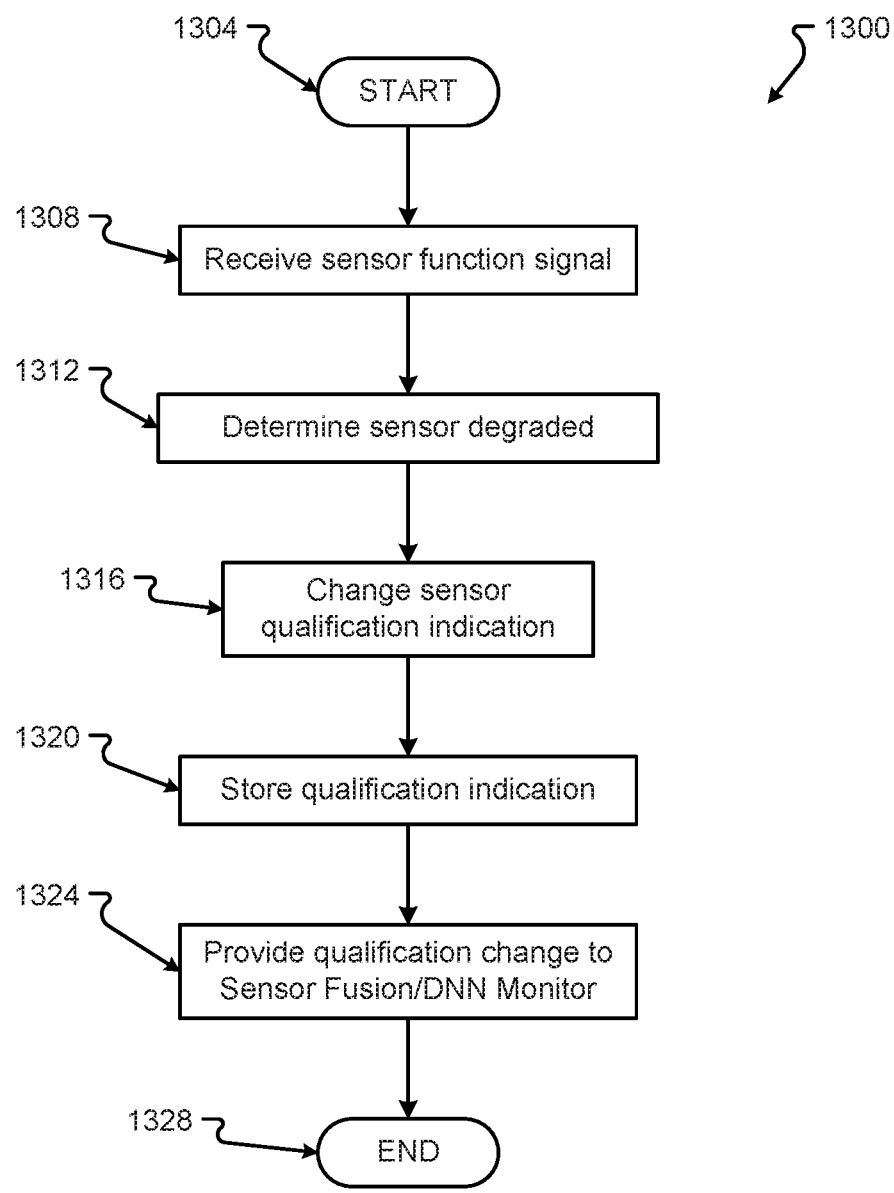
FIG. 13 is a flow chart associated with one or more embodiments presented herein.

An operation 1300 conducted by the sensor qualification function 428 may be as shown in FIG. 13 in accordance with embodiments of the present disclosure. A general order for the steps of the method 1300 is shown in FIG. 13. Generally, the method 1300 starts with a start operation 1304 and ends with operation 1328. The method 1300 can include more or fewer steps or can arrange the order of the steps differently than those shown in FIG. 13. The method 1300 can be executed as a set of computer-executable instructions executed by a computer system or processor and encoded or stored on a computer readable medium. In other configurations, the method 1300 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1300 shall be explained with reference to the systems, components, circuits, modules, software, data structures, signaling processes, models, environments, vehicles, etc. described in conjunction with FIGS. 1-12 and 14A-15.

The sensor qualification function 428 can receive the sensor function signal from a sensor monitor 412, in step 1308. For example, the sensor monitor 412 can provide information indicating if there is any degradation of a sensor or sensor signal. From the sensor check signal, the sensor qualification function 428 can determine if any sensor 304 is degraded, in step 1312. The degradation of a sensor 304 can be a temporary or permanent problem based on the information provided by the sensor monitor 412. The temporal nature of the degradation can affect how the sensor qualification function 428 responds to the degradation. For example, the sensor 304 or zone may not be disqualified if the degradation is temporary or may have a time limit or expiration to recheck for the degradation and requalify the sensor 304 or zone.

Based on what information is provided as to the level of degradation, the sensor qualification function 428 can determine if a change is needed in the qualification index or indication for the sensor 304, in step 1316. For example, if the sensor 304 is permanently and completely degraded, the sensor 304 may be disqualified from providing sensed information. Thus, the sensor qualification function 428 changes the sensor qualification indication 820 in data structure 804. This change may then create a permanent refusal for the sensor fusion/DNN monitor or sensor monitor 412 from using that sensor information. The qualification 820 can be temporary or time-based or may be qualified in that a change in some situation may requalify the sensor 304. Thus, the information about the type of qualification may also be provided in sensor qualification indication 820, which may then inform the decision by the sensor fusion/DNN monitor 416 or the sensor monitor 412 as to how the information from the sensor 304 is to be received and processed. The sensor qualification indication information 852 is stored, in step 1320, in data structure 804. This information 852 may also be provided as a change indication with the information or an indication of the change, in step 1324. Thus, the change in qualification or other information will be sent to the sensor fusion/DNN monitor 416 and/or the sensor monitor 412.

Figure 14A:
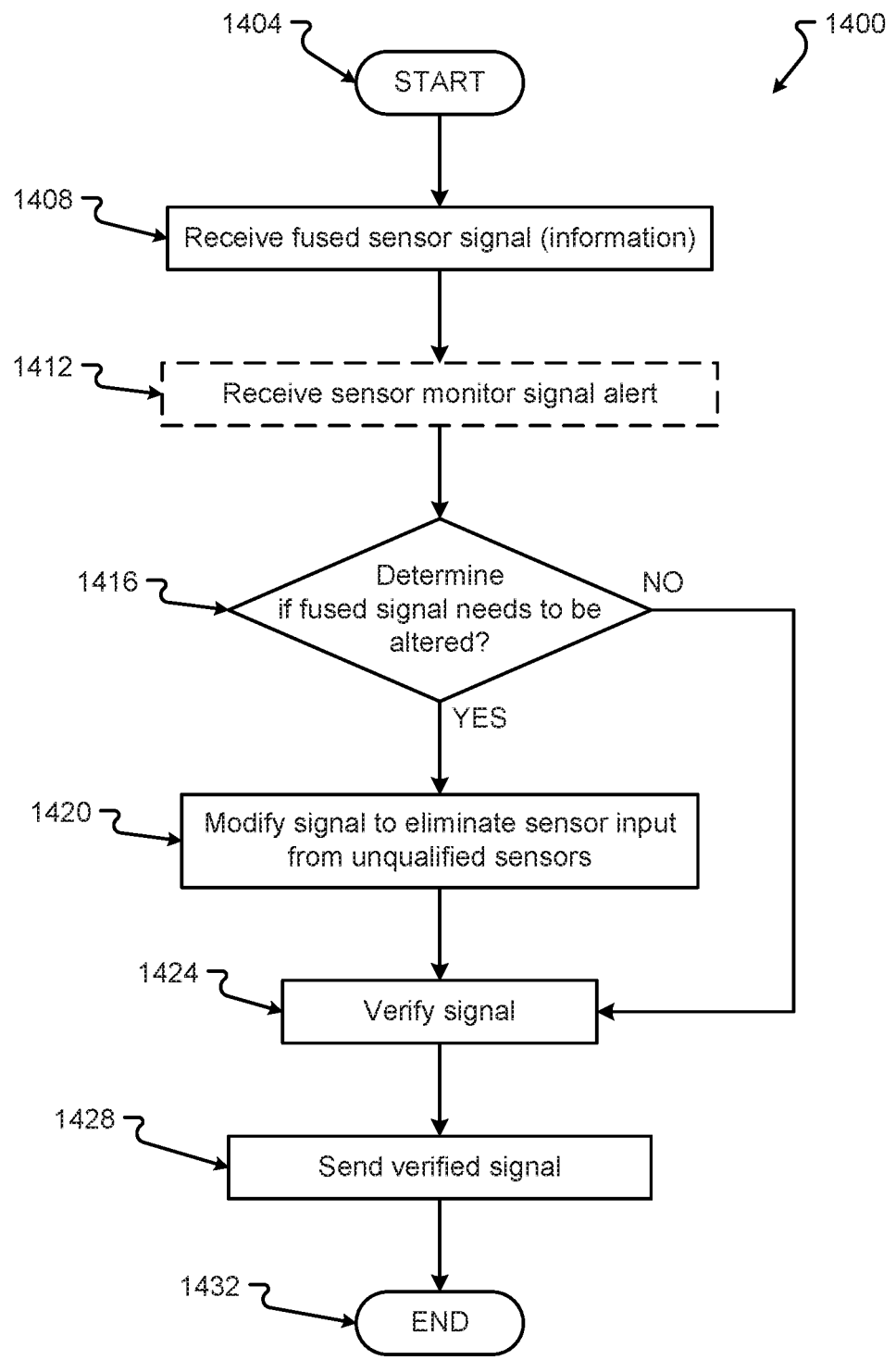
FIG. 14A is a flow chart associated with one or more embodiments presented herein.

An embodiment of a method 1400 for modifying or monitoring the sensor information may be as shown in FIG. 14A in accordance with embodiments of the present disclosure. A general order for the steps of the method 1400 is shown in FIG. 14A. Generally, the method 1400 starts with a start operation 1404 and ends with operation 1432. The method 1400 can include more or fewer steps or can arrange the order of the steps differently than those shown in FIG. 14A. The method 1400 can be executed as a set of computer-executable instructions executed by a computer system or processor and encoded or stored on a computer readable medium. In other configurations, the method 1400 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1400 shall be explained with reference to the systems, components, circuits, modules, software, data structures, signaling processes, models, environments, vehicles, etc. described in conjunction with FIGS. 1-13 and 14B-15.

The process 1400 may be completed by sensor fusion/DNN monitor function 416 and/or the sensor monitor 412. The sensor fusion/DNN monitor function 416 can receive the fused sensor signal information from sensor fusion/DNN 440, in step 1408. Thus, the sensor information may be integrated into a signal describing the current environment around the vehicle 100 that is used by the navigation system 302, vehicle control system 348, or other systems to guide or automatically drive the vehicle 100. This sensor information signal may also include the sensor signal information 436 and/or information as to how the sensor information was consolidated or fused by the DNN.

The sensor monitor 412 can receive the sensor monitor signal, in optional step 1412. This monitor signal may be provided as an alert produced by the sensor qualification function 428. In other words, the sensor monitor 412 receives information about a change in the function of one or more sensors 304 either from the sensor qualification function 420 or the sensor monitor 412. This alert sent to the sensor monitor 412 can provide information associated with possible necessary changes to the fused sensor signal provided by the sensor fusion/DNN 440.

The sensor monitor 412 may then determine if the fused signal needs to be altered, in step 416. If the type of sensor disqualification signal or sensor check function signal is severe enough to warrant a safety hazard, meaning that the vehicle will possibly be directed into an accident or unpredictable driving by the sensor malfunction (by past machine learning or comparison data associated with sensor disqualification provided by a database), the sensor monitor 412 can determine that the fused signal from the sensor fusion/DNN 440 needs to be changed and the process 1400 proceeds YES to step 1420. If the information provided or received by the sensor monitor 412 does not warrant a change in the signal, the method 1400 may proceed NO to step 1424.

In step 1420, the sensor fusion/DNN monitor function 416 can modify the fused signal from the sensor fusion/DNN 440 to eliminate sensor input from the unqualified sensors. In other words, if an object is believed to be detected in a zone based on a sensor signal from a disqualified sensor, that information or indication of an object in that zone can be eliminated. In this way, the improper or incorrect measurements or indications of an object presence from malfunctioning sensors can be eliminated in the verified fused sensor signal 448 sent to the other systems as the final sensor data for vehicle path planner 450.

The sensor fusion/DNN monitor function 416 and/or the sensor monitor 412 can then verify the signal, indicating that the signal has been checked and the sensor information is usable by the navigation system 302, vehicle control system 348, or other systems in the vehicle. The verification of the signal, in step 1424, functions as a quality check and may be indicated to those other systems. The signal 448 that has been verified may then be sent to other functions by the sensor control 400, in step 1428, as the final sensor data for vehicle path planner 450.

Figure 14B:
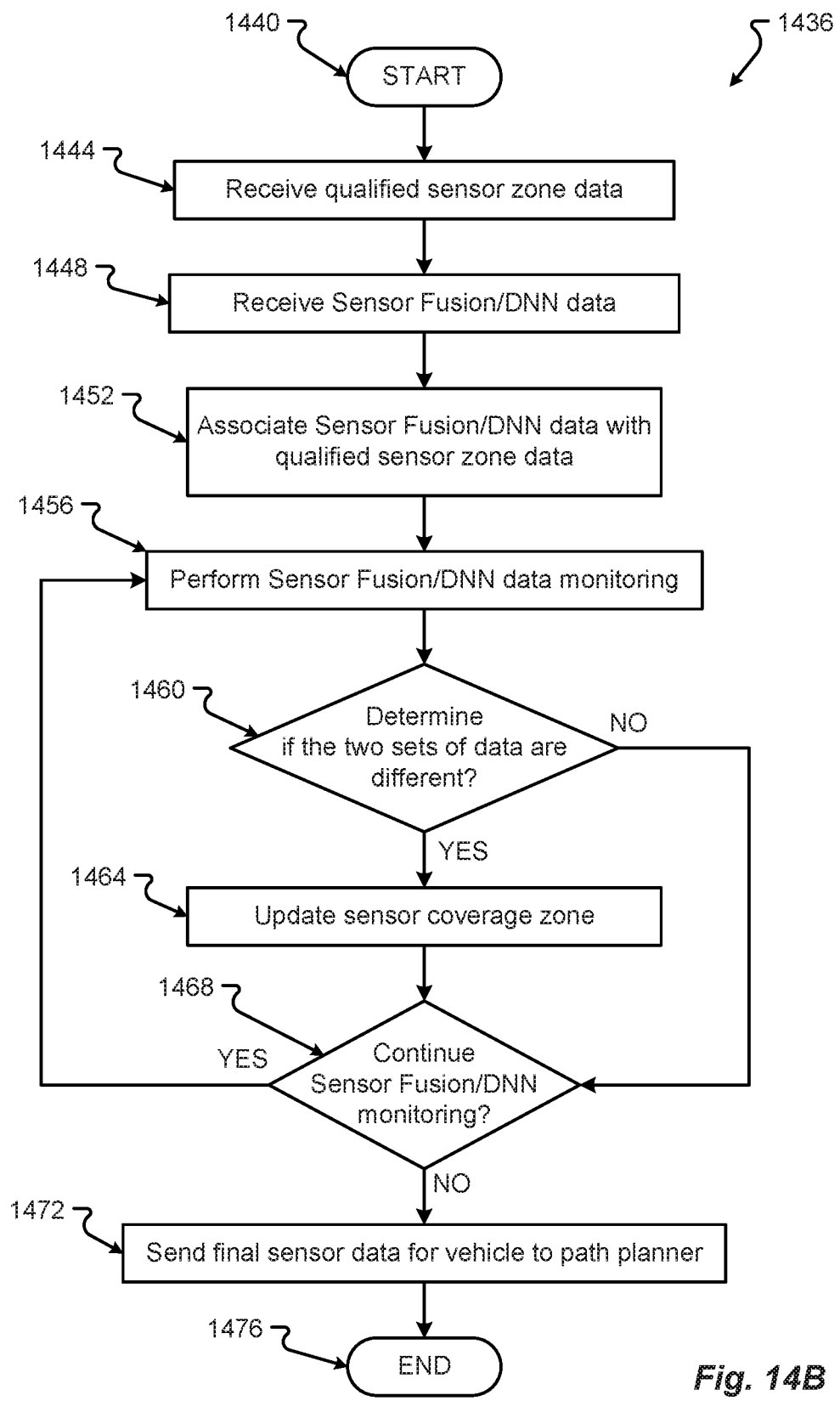
FIG. 14B is a flow chart associated with one or more embodiments presented herein.

An embodiment of another method 1436 for modifying or monitoring the sensor information may be as shown in FIG. 14B in accordance with embodiments of the present disclosure. A general order for the steps of the method 1436 is shown in FIG. 14B. Generally, the method 1436 starts with a start operation 1440 and ends with operation 1476. The method 1436 can include more or fewer steps or can arrange the order of the steps differently than those shown in FIG. 14B. The method 1436 can be executed as a set of computer-executable instructions executed by a computer system or processor and encoded or stored on a computer readable medium. In other configurations, the method 1436 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1436 shall be explained with reference to the systems, components, circuits, modules, software, data structures, signaling processes, models, environments, vehicles, etc. described in conjunction with FIGS. 1-14A and 15.

The process 1436 provided in FIG. 14B again may be completed by sensor fusion/DNN monitor function 416 and/or the sensor monitor 412. The sensor monitor 412 can receive the sensor monitor signal and/or qualified zone information 446, in step 1444. This monitor signal/qualified zone information may be provided as an alert produced by the sensor qualification function 428. In other words, the sensor monitor 412 receives information about a change in the qualification of a zone based on a malfunction or degradation of one or more sensors 304 in the disqualified zone from the sensor qualification function 420. This alert sent to the sensor monitor 412 can provide information associated with possible necessary changes to the fused sensor signal provided by the sensor fusion/DNN 440 as associated with the disqualified zone.

The sensor fusion/DNN monitor function 416 can receive the fused sensor signal information from sensor fusion/DNN 440, in step 1448. Thus, the sensor information may be integrated into a signal describing the current environment around the vehicle 100 that is used by the navigation system 302, vehicle control system 348, or other systems to guide or automatically drive the vehicle 100. This sensor information signal may also include the sensor signal information 436 and/or information as to how the sensor information was consolidated or fused by the DNN.

The sensor monitor 412 may then associate the sensor fusion/DNN data from the sensor fusion/DNN 440 with the qualified sensor zone data from the sensor qualification monitor 428. The association can include the mapping of qualification information to one or more sensors or zones in the sensor fusion/DNN data. The mapping can include a pointer or flag to what data in the sensor fusion/DNN data the sensor qualification data may be associated therewith. As such, the sensor fusion/DNN monitor can determine, based on the presence of the flay or pointer, what data may need to be modified. The sensor monitor 412 may also determine if the two sets of sensor information is different, in step 1460.

The sensor monitor 412 compares the two sets of data above and determines if there are any differences. In some configurations, each data point, identified by an identifier, may be compared. In other configurations, a checksum or other metadata is checked to determine if there are differences between the data and what data is different. If there are differences in the data, the method 1436 proceeds YES to step 1464. If there are no differences in the data, the method 1436 proceeds NO to step 1468.

In step 1464, the sensor monitor 412 can provide the sensor fusion/DNN monitor function 416 information about any differences in the two data sets. Then, the sensor fusion/DNN monitor function 416 can determine if the fused signal needs to be altered, in step 1464. If the type of sensor disqualification signal or sensor check function signal is severe enough to warrant a safety hazard, meaning that the vehicle 100 will possibly be directed into an accident or unpredictable driving by the sensor malfunction (by past machine learning or comparison data associated with sensor disqualification provided by a database), the sensor fusion/DNN monitor function 416 can update the sensor zone coverage to eliminate the use of a sensor signal for a particular zone and/or eliminate any data from an effected zone from being used by the vehicle 100 in automated driving.

Then, the sensor fusion/DNN monitor function 416 and/or the sensor monitor 412 may determine if monitoring should continue. Monitoring continues if a sensor issue was discovered or a period of time has elapsed since the last verification of the sensor signal. A cessation of monitoring may be determined if all sensors have been checked in the current monitoring. If more monitoring ins required, the method 1436 proceeds YES back to step 1456 to continue monitoring. If monitoring is ceased, method 1436 proceeds NO to step 1472.

In step 1472, the sensor fusion/DNN monitor function 416 can modify the fused signal from the sensor fusion/DNN 440 to eliminate sensor input from the unqualified sensor zones. The sensor fusion/DNN monitor function 416 and/or the sensor monitor 412 can then verify the signal, indicating that the signal has been checked and the sensor information is usable by the navigation system 302, vehicle control system 348, or other systems in the vehicle. The verification of the signal, in step 1472, functions as a quality check and may be indicated to those other systems. The signal 448 that has been verified may then be sent to other functions by the sensor control 400 as the final sensor data for vehicle path planner 450.

Figure 15:
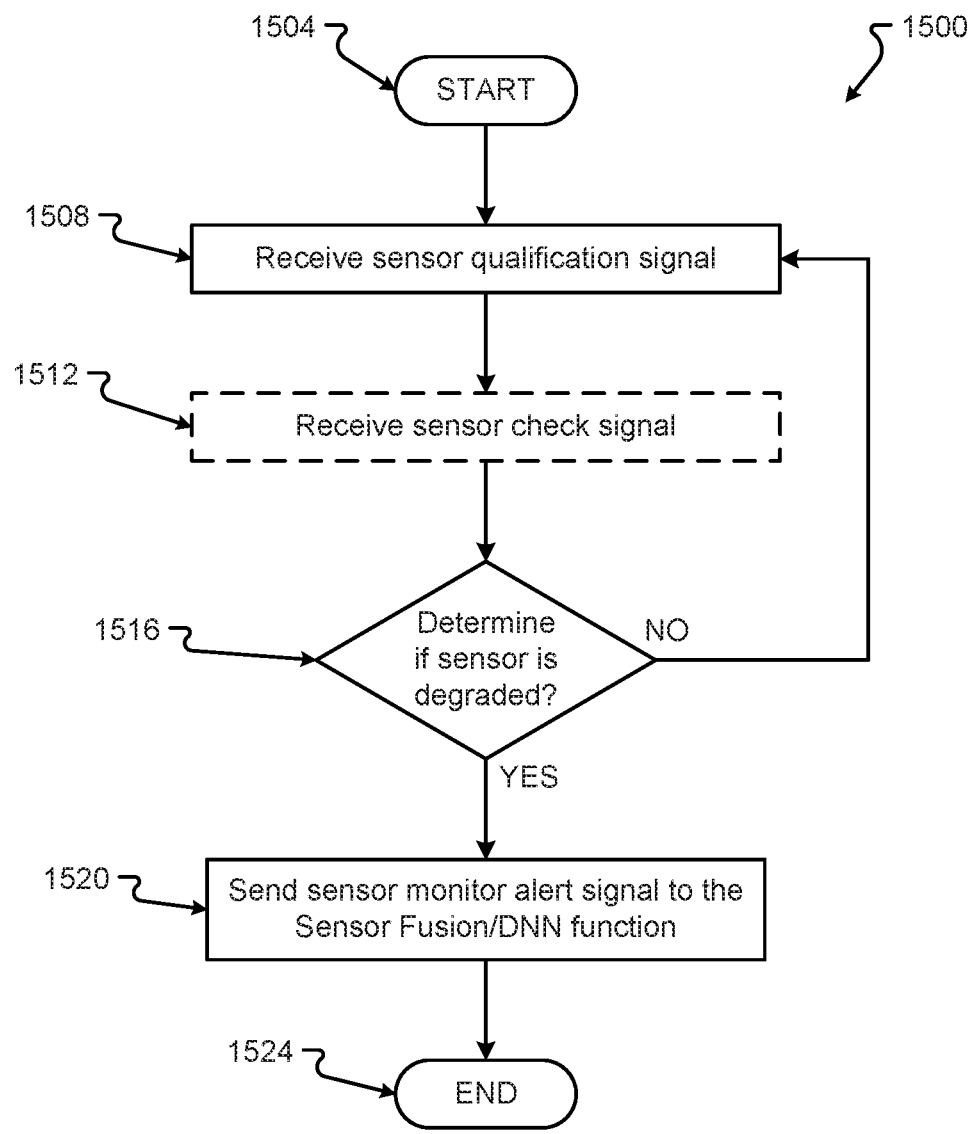
FIG. 15 is a flow chart associated with one or more embodiments presented herein.

An embodiment of a method 1500 that can be completed by the sensor monitor 412 may be as shown in FIG. 15 in accordance with embodiments of the present disclosure. A general order for the steps of the method 1500 is shown in FIG. 15. Generally, the method 1500 starts with a start operation 1504 and ends with operation 1524. The method 1500 can include more or fewer steps or can arrange the order of the steps differently than those shown in FIG. 15. The method 1500 can be executed as a set of computer-executable instructions executed by a computer system or processor and encoded or stored on a computer readable medium. In other configurations, the method 1500 may be executed by a series of components, circuits, gates, etc. created in a hardware device, such as a System of Chip (SOC), Application Specific Integrated Circuit (ASIC), and/or a Field Programmable Gate Array (FPGA). Hereinafter, the method 1500 shall be explained with reference to the systems, components, circuits, modules, software, data structures, signaling processes, models, environments, vehicles, etc. described in conjunction with FIGS. 1-14B.

The sensor monitor 412 can receive sensor qualification signals, in step 1508. The sensor qualification function 428 can send any change to sensor qualification to the sensor monitor 412. Further, the sensor monitor 412 can receive a signal check signal from sensor 304 check function 412, in step 1512. This signal may be an indication as to a malfunctioning sensor 304 or other change in one or more sensors 304 in the vehicle 100.

This information may then be reviewed or analyzed by the sensor monitor 412 to determine if a sensor 304 has been degraded, in step 1516. Degradation of a sensor 304 can include the complete disqualification or partial disqualification of the sensor 304. Degradation may also indicate that a sensor 304 is intermittently malfunctioning, has some other issue and/or other events have occurred with the sensor 304 based on a sensor check signal. If a sensor has been degraded, the method 1500 proceeds YES to step 1520 where the sensor monitor 412 sends the sensor monitor alert signal to the sensor fusion/DNN monitor function 416 indicating that the sensor fusion/DNN 440 output needs to be modified. If there is no degradation to a sensor 304, the method 1500 proceeds NO back to step 1508, to await a sensor qualification or other signal to be sent indicating a check needs to be run by the sensor monitor 412.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present application include a vehicle, comprising: a vehicle interior for receiving one or more occupants; a plurality of sensors to collect sensed information associated with an environment around the vehicle; an automated driving system; a sensor control processor in communication with the plurality of sensors and the automated driving system, wherein the sensor control processor: receives a first sensor signal from a first sensor; receives a second sensor signal from a second sensor; determines a zone in the environment where a first coverage of the first sensor overlaps with a second coverage of the second sensor; and determines a degradation of the first sensor and/or second sensor based on a test of information, in the first sensor signal and the second sensor signal, associated with the zone.

Any of the one or more above aspects, wherein, if the first sensor or the second sensor are degraded, the sensor control processor alters information sent to the automated driving system.

Any of the one or more above aspects, wherein the test is a plausibility check.

Any of the one or more above aspects, wherein the sensor control processor further: receives a third sensor signal from a third sensor; determines a second zone in the environment where the first coverage of the first sensor overlaps with the second coverage of the second sensor and a third coverage of the third sensor; and determines a second degradation of the first sensor, the second sensor, and/or the third sensor based on a second test of information, in the first sensor signal, the second sensor signal, and the third signal, associated with the second zone.

Any of the one or more above aspects, wherein the second test of information is a two-way voting.

Any of the one or more above aspects, wherein, if the first sensor, the second sensor, and or third sensor are degraded, the sensor control processor alters information sent to the automated driving system.

Any of the one or more above aspects, wherein the sensor control processor disqualifies the first or second sensor to alter the information sent to the automated driving system.

Any of the one or more above aspects, wherein the sensor control processor disqualifies the zone to alter the information sent to the automated driving system.

Any of the one or more above aspects, wherein the first sensor is a camera.

Any of the one or more above aspects, wherein the second sensor is a radar.

Embodiments of the present application include a method, comprising: collecting, by a plurality of sensors of a vehicle, sensed information associated with an exterior environment of the vehicle; receiving, by a sensor control processor, a first sensor signal from a first sensor; receiving, by the sensor control processor, a second sensor signal from a second sensor; determining, by a zone definition function, a zone in the environment where a first coverage of the first sensor overlaps with a second coverage of the second sensor; determining, by a sensor monitor, a degradation of the first sensor and/or second sensor based on a test of information, in the first sensor signal and the second sensor signal, associated with the zone; and if the first sensor or the second sensor are degraded, altering, by a sensor fusion/deep neural network (DNN) monitor function, information sent to the automated driving (AD) system, wherein the AD system changes a characteristic of automated driving based on the altered information.

Any of the one or more above aspects, wherein the test is a plausibility check.

Any of the one or more above aspects, further comprising: receiving a third sensor signal from a third sensor; determining a second zone in the environment where the first coverage of the first sensor overlaps with the second coverage of the second sensor and a third coverage of the third sensor; and determining a second degradation of the first sensor, the second sensor, and/or the third sensor based on a second test of information, in the first sensor signal, the second sensor signal, and the third signal, associated with the second zone.

Any of the one or more above aspects, wherein the second test of information is a two-way voting.

Any of the one or more above aspects, further comprising one of: disqualifying, by the sensor fusion/DNN monitor, the first or second sensor to alter the information sent to the automated driving system; or disqualifying, by the sensor fusion/DNN monitor, the zone to alter the information sent to the automated driving system.

Embodiments of the present application include a non-transitory computer readable medium that when executed by a processor of a vehicle causes the processor to execute a method, comprising: collecting, by a plurality of sensors of a vehicle, sensed information associated with an exterior environment of the vehicle; receiving, by a sensor control processor, a first sensor signal from a first sensor; receiving, by the sensor control processor, a second sensor signal from a second sensor; determining, by a zone definition function, a zone in the environment where a first coverage of the first sensor overlaps with a second coverage of the second sensor; determining, by a sensor monitor, a degradation of the first sensor and/or second sensor based on a test of information, in the first sensor signal and the second sensor signal, associated with the zone; and if the first sensor or the second sensor are degraded, altering, by a sensor fusion/deep neural network (DNN) monitor function, information sent to the automated driving (AD) system, wherein the AD system changes a characteristic of automated driving based on the altered information.

Any of the one or more above aspects, wherein the test is a plausibility check.

Any of the one or more above aspects, the method further comprising: receiving a third sensor signal from a third sensor; determining a second zone in the environment where the first coverage of the first sensor overlaps with the second coverage of the second sensor and a third coverage of the third sensor; and determining a second degradation of the first sensor, the second sensor, and/or the third sensor based on a second test of information, in the first sensor signal, the second sensor signal, and the third signal, associated with the second zone.

Any of the one or more above aspects, wherein the second test of information is a two-way voting.

Any of the one or more above aspects, the method further comprising one of: disqualifying, by the sensor fusion/DNN monitor, the first or second sensor to alter the information sent to the automated driving system; or disqualifying, by the sensor fusion/DNN monitor, the zone to alter the information sent to the automated driving system.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A vehicle, comprising:
a vehicle interior for receiving one or more occupants;
a plurality of sensors to collect sensed information associated with an environment around the vehicle;
an automated driving system; and
a sensor control processor in communication with the plurality of sensors and the automated driving system, wherein the sensor control processor:
receives a first sensor signal from a first sensor of the plurality of sensors;
receives a second sensor signal from a second sensor of the plurality of sensors;
determines a zone in the environment where a first coverage of the first sensor overlaps with a second coverage of the second sensor;
determines a degradation of at least one of the first sensor and the second sensor based on a test of information, in the first sensor signal and the second sensor signal, associated with the zone;
stores, in a memory of the vehicle and based on the degradation determined, sensor qualification data for the at least one of the first sensor and the second sensor associated with the zone;
receives a fused sensor signal from the plurality of sensors, wherein the fused sensor signal comprises the sensed information associated with the environment around the vehicle;
determines, based on the fused sensor signal received and the sensor qualification data stored, that the zone is associated with a disqualification; and
modifies, based on disqualification, the fused sensor signal received into a verified fused sensor signal generated excluding at least one of the first sensor signal, the second sensor signal, and the zone.

2. The vehicle of claim 1, wherein the sensor control processor sends the verified fused sensor signal to the automated driving system without sending the fused sensor signal to the automated driving system.

3. The vehicle of claim 1, wherein the test is a plausibility check, wherein the first sensor and the second sensor are a same type of sensor in the zone, and wherein in determining the degradation of at least one of the first sensor and the second sensor, the sensor control processor further:
determines an object in the environment sensed by one of the first sensor and the second sensor that is not sensed by an other of the sensor and the second sensor.

4. The vehicle of claim 1, wherein the sensor control processor further:
receives a third sensor signal from a third sensor;
determines a second zone in the environment where the first coverage of the first sensor overlaps with the second coverage of the second sensor and a third coverage of the third sensor; and
determines a second degradation of at least one of the first sensor, the second sensor, and the third sensor based on a second test of information, in the first sensor signal, the second sensor signal, and the third signal, associated with the second zone.

5. The vehicle of claim 4, wherein the second test of information is a two-way voting, and wherein the at least one of the first sensor, the second sensor, and the third sensor comprise a different type of sensor.

6. The vehicle of claim 4, wherein the verified fused sensor signal is generated excluding at least one of the third sensor and the second zone, and wherein the sensor control processor sends the verified fused sensor signal to the automated driving system without sending the fused sensor signal to the automated driving system.

7. The vehicle of claim 1, wherein the sensor qualification data stored by the sensor control processor includes an indication that disqualifies the at least one of the first sensor and the second sensor from inclusion in the verified fused sensor signal.

8. The vehicle of claim 1, wherein the sensor qualification data stored by the sensor control processor includes an indication that disqualifies the zone from inclusion in the verified fused sensor signal.

9. The vehicle of claim 1, wherein the first sensor is a camera.

10. The vehicle of claim 9, wherein the second sensor is a radar.

11. A method, comprising:
collecting, by a plurality of sensors of a vehicle, sensed information associated with an exterior environment of the vehicle;
receiving, by a sensor control processor, a first sensor signal from a first sensor of the plurality of the sensors;
receiving, by the sensor control processor, a second sensor signal from a second sensor of the plurality of sensors;
determining, by a zone definition function, a zone in the environment where a first coverage of the first sensor overlaps with a second coverage of the second sensor;
determining, by a sensor monitor, a degradation of at least one of the first sensor and the second sensor based on a test of information, in the first sensor signal and the second sensor signal, associated with the zone;
storing, in a memory of the vehicle and based on the degradation determined, senor qualification data for the at least one of the first sensor and the second sensor associated with the zone;
receiving, from the plurality of sensors, a fused sensor signal comprising the sensed information associated with the environment around the vehicle;
determining, by a sensor fusion/deep neural network (DNN) monitor function based on the fused sensor signal received and the sensor qualification data stored, that the zone is associated with a disqualification;
modifying, by the sensor fusion/DNN monitor function based on disqualification, the fused sensor signal received into a verified fused sensor signal generated excluding at least one of the first sensor signal, the second sensor signal, and the zone; and
sending, by the sensor fusion/DNN monitor function, the verified fused sensor signal to an automated driving (AD) system of the vehicle without sending the fused sensor signal to the automated driving system, wherein the AD system changes a characteristic of autonomous driving for the vehicle based on receiving the verified fused sensor signal.

12. The method of claim 11, wherein the test is a plausibility check, wherein the first sensor and the second sensor are a same type of sensor in the zone, and wherein determining the degradation of at least one of the first sensor and the second sensor further comprises:
determining, by the sensor monitor, and object in the environment sensed by one of the first sensor and the second is not sensed by an other of the first sensor and the second sensor.

13. The method of claim 12, further comprising:
receiving a third sensor signal from a third sensor;
determining a second zone in the environment where the first coverage of the first sensor overlaps with the second coverage of the second sensor and a third coverage of the third sensor; and determining a second degradation of at least one of the first sensor, the second sensor, and the third sensor based on a second test of information, in the first sensor signal, the second sensor signal, and the third signal, associated with the second zone.

14. The method of claim 13, wherein the second test of information is a two-way voting, and wherein the at least one of the first sensor, the second sensor, and the third sensor comprise a different type of sensor.

15. The method of claim 14, further comprising one of:
disqualifying, by the sensor fusion/DNN monitor, the at least one of the first sensor and the second sensor by including a sensor disqualification indication in the sensor qualification data store in memory, and wherein the sensor disqualification indication disqualifies the at least one of the first sensor and the second sensor from inclusion in the verified fused sensor signal sent to the AD system; or
disqualifying, by the sensor fusion/DNN monitor, the zone by including a zone disqualification indication in the sensor qualification data stored in the memory, and wherein the zone disqualification indication disqualifies the zone from inclusion in the verified fused sensor signal sent to the AD system.

16. A non-transitory computer readable medium that when executed by a processor of a vehicle causes the processor to execute a method, comprising:
collecting, by a plurality of sensors of a vehicle, sensed information associated with an exterior environment of the vehicle;
receiving, by a sensor control processor, a first sensor signal from a first sensor of the plurality of sensors;
receiving, by the sensor control processor, a second sensor signal from a second sensor of the plurality of sensors;
determining, by a zone definition function, a zone in the environment where a first coverage of the first sensor overlaps with a second coverage of the second sensor;
determining, by a sensor monitor, a degradation of at least one of the first sensor and the second sensor based on a test of information, in the first sensor signal and the second sensor signal, associated with the zone;
storing, in a memory of the vehicle and based on the degradation determined, sensor qualification data for the at least one of the first sensor and the second sensor associated with the zone;

receiving, from the plurality of sensors, a fused sensor signal comprising the sensed information associated with the environment around the vehicle;
determining, by a sensor fusion/deep neural network (DNN) monitor function based on the fused sensor signal received and the sensor qualification data stored, that the zone is associated with a disqualification;
modifying, by the sensor fusion/DNN monitor function based on disqualification, the fused sensor signal received into a verified fused sensor signal generated excluding at least one of the first sensor signal, the second sensor signal, and the zone; and
sending, by the sensor fusion/DNN monitor function, the verified fused sensor signal to an automated driving (AD) system, wherein the AD system changes a characteristic of autonomous driving for the vehicle based on receiving the verified fused sensor signal.

17. The non-transitory computer readable medium of claim 16, wherein the test is a plausibility check between information provided by the plurality of sensors of the vehicle.

18. The non-transitory computer readable medium of claim 17, the method further comprising:
receiving a third sensor signal from a third sensor;
determining a second zone in the environment where the first coverage of the first sensor overlaps with the second coverage of the second sensor and a third coverage of the third sensor; and
determining a second degradation of at least one of the first sensor, the second sensor, the third sensor based on a second test of information, in the first sensor signal, the second sensor signal, and the third signal, associated with the second zone.

19. The non-transitory computer readable medium of claim 18, wherein the second test of information is a two-way voting between information provided by the plurality of sensors of the vehicle.

20. The non-transitory computer readable medium of claim 19, the method further comprising:
disqualifying, by the sensor fusion/DNN monitor, the at least one of the first sensor, the second sensor, the zone, and the second zone by including a disqualification indication in the sensor qualification data stored in the memory, and wherein the sensor disqualification indication disqualifies the at least one of the first sensor, the second sensor, the zone, and the second zone from inclusion in the verified fused sensor signal sent to the AD system.

* * * * *

UNITED STATES PATENT AND TRADEMARK OFFICE
CERTIFICATE OF CORRECTION

PATENT NO. : 10,551,838 B2
APPLICATION NO. : 15/671521
DATED : February 4, 2020
INVENTOR(S) : Xiaodong Liu et al.

Page 1 of 1

It is certified that error appears in the above-identified patent and that said Letters Patent is hereby corrected as shown below:

In the Claims

Claim 3, Column 51, Line 47, replace "the sensor" with --the first sensor-- therein.
Claim 11, Column 52, Line 22, delete "the" before "sensors" therein.
Claim 11, Column 52, Line 33, replace "senor" with --sensor-- therein.
Claim 12, Column 52, Line 60, replace "and" with --an-- therein.
Claim 12, Column 52, Line 62, after "second" insert --sensor-- therein.
Claim 15, Column 53, Line 16, replace "data store in memory" with --data stored in the memory-- therein.
Claim 16, Column 54, Line 7, replace the ":" with a --;-- after "disqualification" therein.
Claim 18, Column 54, Line 29, after "the second sensor," insert --and-- therein.

Signed and Sealed this
Seventh Day of April, 2020

Andrei Iancu
*Director of the United States Patent and Trademark Office*